(12) United States Patent
Fakoorian et al.

(10) Patent No.: US 12,028,881 B2
(45) Date of Patent: Jul. 2, 2024

(54) BANDWIDTH PART SWITCHING TECHNIQUES FOR WIRELESS COMMUNICATIONS SYSTEMS

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/224,734

(22) Filed: Apr. 7, 2021

(65) Prior Publication Data

US 2021/0321409 A1 Oct. 14, 2021

Related U.S. Application Data

(60) Provisional application No. 63/008,563, filed on Apr. 10, 2020.

(51) Int. Cl.
| | |
|---|---|
| *H04W 72/53* | (2023.01) |
| *H04L 5/00* | (2006.01) |
| *H04L 5/14* | (2006.01) |
| *H04W 8/24* | (2009.01) |
| *H04W 72/0446* | (2023.01) |

(Continued)

(52) U.S. Cl.
CPC ............. *H04W 72/53* (2023.01); *H04L 5/001* (2013.01); *H04L 5/0053* (2013.01); *H04L 5/0092* (2013.01); *H04L 5/14* (2013.01); *H04L 5/1461* (2013.01); *H04W 8/24* (2013.01);

(Continued)

(58) Field of Classification Search
CPC . H04W 72/0493; H04W 8/24; H04W 72/042; H04W 72/0453; H04W 72/048; H04W 72/0446; H04W 72/53; H04W 72/23; H04W 72/51; H04L 5/14;

(Continued)

(56) References Cited

U.S. PATENT DOCUMENTS

2015/0085718 A1* 3/2015 Chen ................. H04L 5/14
  370/280
2019/0124558 A1* 4/2019 Ang ................. H04L 5/001

(Continued)

FOREIGN PATENT DOCUMENTS

WO  WO-2019051177 A1 * 3/2019 ........... H04B 7/0602

*Primary Examiner* — Omar J Ghowrwal
(74) *Attorney, Agent, or Firm* — Holland & Hart LLP

(57) ABSTRACT

Methods, systems, and devices for wireless communications are described. A user equipment (UE) may transmit, to a base station, a control message indicating a capability of the UE to operate in a full duplex mode on a single carrier in an unpaired radio frequency spectrum. The UE may receive, from the base station, control signaling indicating a default bandwidth part associated with the full duplex mode or a half-duplex mode based at least in part on the control message. The UE and the base station may communicate using an active bandwidth part. The UE and the base station may then communicate, based on an expiration of an inactivity timer associated with the active bandwidth part, using the default bandwidth part in accordance with the full duplex mode/or the half-duplex mode.

29 Claims, 18 Drawing Sheets

(51) Int. Cl.
    *H04W 72/0453*    (2023.01)
    *H04W 72/23*       (2023.01)
    *H04W 72/51*       (2023.01)

(52) U.S. Cl.
    CPC ... *H04W 72/0446* (2013.01); *H04W 72/0453* (2013.01); *H04W 72/23* (2023.01); *H04W 72/51* (2023.01)

(58) Field of Classification Search
    CPC ..... H04L 5/001; H04L 5/0053; H04L 5/0092; H04L 5/1461
    See application file for complete search history.

(56) References Cited

U.S. PATENT DOCUMENTS

| | | | | |
|---|---|---|---|---|
| 2021/0184824 A1* | 6/2021 | Kwak | .................... | H04L 5/0092 |
| 2021/0314946 A1* | 10/2021 | Ang | ....................... | H04L 5/0087 |
| 2022/0240284 A1* | 7/2022 | Zhou | ..................... | H04L 5/0096 |

* cited by examiner

BANDWIDTH PART SWITCHING TECHNIQUES FOR WIRELESS COMMUNICATIONS SYSTEMS

CROSS REFERENCE

The present Application for Patent claims the benefit of U.S. Provisional Patent Application No. 63/008,563 by Fakoorian et al., entitled "BANDWIDTH PART SWITCHING TECHNIQUES FOR WIRELESS COMMUNICATIONS SYSTEMS," filed Apr. 10, 2020, assigned to the assignee hereof, and expressly incorporated by reference herein.

FIELD OF TECHNOLOGY

The following relates generally to wireless communications and more specifically to bandwidth part switching techniques for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some systems, a UE may communicate with a base station using a bandwidth part. However, conventional techniques for bandwidth part switching may be deficient.

SUMMARY

The described techniques relate to improved methods, systems, devices, and apparatuses that support bandwidth part (BWP) switching techniques for wireless communications systems. Generally, the described techniques provide for a user equipment (UE) or a base station to perform BWP switching in accordance with one or more operation modes of the UE. For example, the one or more operation modes of the UE may include a full duplex mode (e.g., a frequency division duplexing (FDD) operation mode), a half-duplex mode (e.g., a time division duplexing (TDD) operation mode), or any combination thereof. For example, the UE may transmit a control message to a base station indicating a capability of the UE (e.g., a capability to operate in a FDD mode on a single carrier in an unpaired radio frequency spectrum). The base station may transmit control signaling to the UE indicating a BWP switching configuration. For example, the control signaling may configure the UE with one or more default BWPs (e.g., an uplink BWP and a downlink BWP) associated with a FDD mode, one or more BWPs associated with a TDD mode, or both. The UE and the base station may communicate using an active BWP (e.g., indicated by downlink control information (DCI)), such as an active uplink BWP, an active downlink BWP, or both.

In some examples, an inactivity timer associated with the active BWP may expire (e.g., the UE may fail to receive DCI via the active BWP for a threshold time period). Upon expiration of the inactivity timer, the UE may switch from an active BWP associated with an operation mode (e.g., a TDD mode or a FDD mode) to a default BWP associated with an operation mode (e.g., a TDD mode or a FDD mode). For example, the UE may switch one or more BWPs, one or more operation modes, or both in accordance with the example BWP schemes described herein. Such schemes may enable more efficient communications in the wireless communications system, ensure that one or more thresholds are satisfied (e.g., a guard band between one or more BWPs in an FDD mode may satisfy a minimum guard band threshold), among other benefits.

A method of wireless communications at a UE is described. The method may include transmitting a control message indicating a capability of the UE to operate in a full duplex mode on a single carrier in an unpaired radio frequency spectrum, receiving, from a base station, control signaling indicating a default BWP associated with the full duplex mode or a half-duplex mode based on the control message, and communicating, based on expiration of an inactivity timer associated with an active BWP, with the base station using the default BWP in accordance with the full duplex mode or the half-duplex mode.

An apparatus for wireless communications at a UE is described. The apparatus may include a processor, memory coupled with the processor, and instructions stored in the memory. The instructions may be executable by the processor to cause the apparatus to transmit a control message indicating a capability of the UE to operate in a full duplex mode on a single carrier in an unpaired radio frequency spectrum, receive, from a base station, control signaling indicating a default BWP associated with the full duplex mode or a half-duplex mode based on the control message, and communicate, based on expiration of an inactivity timer associated with an active BWP, with the base station using the default BWP in accordance with the full duplex mode or the half-duplex mode.

Another apparatus for wireless communications at a UE is described. The apparatus may include means for transmitting a control message indicating a capability of the UE to operate in a full duplex mode on a single carrier in an unpaired radio frequency spectrum, receiving, from a base station, control signaling indicating a default BWP associated with the full duplex mode or a half-duplex mode based on the control message, and communicating, based on expiration of an inactivity timer associated with an active BWP, with the base station using the default BWP in accordance with the full duplex mode or the half-duplex mode.

A non-transitory computer-readable medium storing code for wireless communications at a UE is described. The code may include instructions executable by a processor to transmit a control message indicating a capability of the UE to operate in a full duplex mode on a single carrier in an unpaired radio frequency spectrum, receive, from a base station, control signaling indicating a default BWP associated with the full duplex mode or a half-duplex mode based on the control message, and communicate, based on expiration of an inactivity timer associated with an active BWP, with the base station using the default BWP in accordance with the full duplex mode or the half-duplex mode.

In some examples of the method, apparatuses, and non-transitory computer-readable medium described herein, receiving the control signaling may include operations, features, means, or instructions for receiving the control signaling indicating the default BWP that includes a default uplink BWP and a default downlink BWP for operation in the half-duplex mode.

In some examples of the method, apparatuses, and non-transitory computer-readable medium described herein, receiving the control signaling may include operations, features, means, or instructions for receiving the control signaling indicating the default BWP that includes a default uplink BWP and a default downlink BWP for operation in the full duplex mode.

In some examples of the method, apparatuses, and non-transitory computer-readable medium described herein, receiving the control signaling may include operations, features, means, or instructions for receiving the control signaling indicating the default BWP that includes a first default uplink BWP and a first default downlink BWP for operation in the half-duplex mode, and a second default uplink BWP and a second default downlink BWP for operation in the full duplex mode.

In some examples of the method, apparatuses, and non-transitory computer-readable medium described herein, the control signaling configures the UE to operate in one of the half-duplex mode or the full duplex mode upon expiration of the inactivity timer.

Some examples of the method, apparatuses, and non-transitory computer-readable medium described herein may further include operations, features, means, or instructions for receiving DCI via the active BWP, the active BWP including an uplink active BWP or a downlink active BWP, and restarting the inactivity timer based on receiving the DCI via the active BWP.

Some examples of the method, apparatuses, and non-transitory computer-readable medium described herein may further include operations, features, means, or instructions for communicating, prior to expiration of the inactivity timer, in the full duplex mode using the active BWP, the active BWP including an active uplink BWP and an active downlink BWP.

In some examples of the method, apparatuses, and non-transitory computer-readable medium described herein, communicating using the default BWP may include operations, features, means, or instructions for communicating, in the half-duplex mode, using the default BWP that includes a default uplink BWP and a default downlink BWP, the default uplink BWP differs from the active uplink BWP and the default downlink BWP differs from the active downlink BWP.

In some examples of the method, apparatuses, and non-transitory computer-readable medium described herein, communicating using the default BWP may include operations, features, means, or instructions for communicating, in the full duplex mode, using the default BWP that includes a default downlink BWP that differs from the active downlink BWP, and using the active uplink BWP.

In some examples of the method, apparatuses, and non-transitory computer-readable medium described herein, a guard band between the default downlink BWP and the active uplink BWP satisfies a threshold.

In some examples of the method, apparatuses, and non-transitory computer-readable medium described herein, communicating using the default BWP may include operations, features, means, or instructions for communicating, in the full duplex mode, using the default BWP that includes a default downlink BWP and a default uplink BWP, the default downlink BWP differs from the active downlink BWP and the default uplink BWP differs from the active uplink BWP.

In some examples of the method, apparatuses, and non-transitory computer-readable medium described herein, a guard band between the default downlink BWP and the default uplink BWP satisfies a threshold.

Some examples of the method, apparatuses, and non-transitory computer-readable medium described herein may further include operations, features, means, or instructions for communicating, prior to expiration of the inactivity timer, in the half-duplex mode using the active BWP, the active BWP including an active uplink BWP and an active downlink BWP.

In some examples of the method, apparatuses, and non-transitory computer-readable medium described herein, communicating using the default BWP may include operations, features, means, or instructions for communicating, in the half-duplex mode, using the default BWP that includes a default uplink BWP and a default downlink BWP, the default uplink BWP differs from the active uplink BWP and the default downlink BWP differs from the active downlink BWP.

In some examples of the method, apparatuses, and non-transitory computer-readable medium described herein, communicating using the default BWP may include operations, features, means, or instructions for communicating, in the full duplex mode, using the default BWP that includes a default downlink BWP, the default downlink BWP differs from the active downlink BWP.

In some examples of the method, apparatuses, and non-transitory computer-readable medium described herein, communicating using the default BWP may include operations, features, means, or instructions for communicating, in the full duplex mode, using the default BWP that includes a default uplink BWP, the default uplink BWP differs from the active uplink BWP.

In some examples of the method, apparatuses, and non-transitory computer-readable medium described herein, receiving the control signaling may include operations, features, means, or instructions for receiving the control signaling that indicates the default BWP that includes a first default BWP associated with the half-duplex mode and the default BWP that includes a second default BWP associated with the full duplex mode, and communicating, upon expiration of the inactivity timer, in one of the half-duplex mode or the full duplex mode subsequent to expiration of the inactivity timer based on the control signaling.

In some examples of the method, apparatuses, and non-transitory computer-readable medium described herein, receiving the control signaling may include operations, features, means, or instructions for receiving the control signaling that indicates the default BWP and a default operation mode, and communicating, upon expiration of the inactivity timer, in the default operation mode based on the control signaling.

In some examples of the method, apparatuses, and non-transitory computer-readable medium described herein, the default operation mode includes the half-duplex mode or the full duplex mode.

In some examples of the method, apparatuses, and non-transitory computer-readable medium described herein, the full duplex mode includes a frequency division duplexing mode and the half-duplex mode includes a time division duplexing mode, the frequency division duplexing mode associated with an uplink portion and a downlink portion of the single carrier having overlapping frequency resources or separate frequency resources.

A method of wireless communications at a base station is described. The method may include receiving a control message indicating a capability of a UE to operate in a full duplex mode on a single carrier in an unpaired radio frequency spectrum, transmitting, to the UE, control signaling indicating a default BWP associated with the full duplex mode or a half-duplex mode based on the control message, and communicating, based on expiration of an inactivity time period associated with an active BWP, with the UE using the default BWP in accordance with the full duplex mode or the half-duplex mode.

An apparatus for wireless communications at a base station is described. The apparatus may include a processor, memory coupled with the processor, and instructions stored in the memory. The instructions may be executable by the processor to cause the apparatus to receive a control message indicating a capability of a UE to operate in a full duplex mode on a single carrier in an unpaired radio frequency spectrum, transmit, to the UE, control signaling indicating a default BWP associated with the full duplex mode or a half-duplex mode based on the control message, and communicate, based on expiration of an inactivity time period associated with an active BWP, with the UE using the default BWP in accordance with the full duplex mode or the half-duplex mode.

Another apparatus for wireless communications at a base station is described. The apparatus may include means for receiving a control message indicating a capability of a UE to operate in a full duplex mode on a single carrier in an unpaired radio frequency spectrum, transmitting, to the UE, control signaling indicating a default BWP associated with the full duplex mode or a half-duplex mode based on the control message, and communicating, based on expiration of an inactivity time period associated with an active BWP, with the UE using the default BWP in accordance with the full duplex mode or the half-duplex mode.

A non-transitory computer-readable medium storing code for wireless communications at a base station is described. The code may include instructions executable by a processor to receive a control message indicating a capability of a UE to operate in a full duplex mode on a single carrier in an unpaired radio frequency spectrum, transmit, to the UE, control signaling indicating a default BWP associated with the full duplex mode or a half-duplex mode based on the control message, and communicate, based on expiration of an inactivity time period associated with an active BWP, with the UE using the default BWP in accordance with the full duplex mode or the half-duplex mode.

In some examples of the method, apparatuses, and non-transitory computer-readable medium described herein, transmitting the control signaling may include operations, features, means, or instructions for transmitting the control signaling indicating the default BWP that includes a default uplink BWP and a default downlink BWP for operation in the half-duplex mode.

In some examples of the method, apparatuses, and non-transitory computer-readable medium described herein, transmitting the control signaling may include operations, features, means, or instructions for transmitting the control signaling indicating the default BWP that includes a default uplink BWP and a default downlink BWP for operation in the full duplex mode.

In some examples of the method, apparatuses, and non-transitory computer-readable medium described herein, transmitting the control signaling may include operations, features, means, or instructions for transmitting the control signaling indicating the default BWP that includes a first default uplink BWP and a first default downlink BWP for operation in the half-duplex mode, and a second default uplink BWP and a second default downlink BWP for operation in the full duplex mode.

In some examples of the method, apparatuses, and non-transitory computer-readable medium described herein, the control signaling configures the UE to operate in one of the half-duplex mode or the full duplex mode upon expiration of the inactivity time period.

Some examples of the method, apparatuses, and non-transitory computer-readable medium described herein may further include operations, features, means, or instructions for communicating, prior to expiration of the inactivity time period, in the full duplex mode using the active BWP, the active BWP including an active uplink BWP and an active downlink BWP.

In some examples of the method, apparatuses, and non-transitory computer-readable medium described herein, communicating using the default BWP may include operations, features, means, or instructions for communicating, in the half-duplex mode, using the default BWP that includes a default uplink BWP and a default downlink BWP, the default uplink BWP differs from the active uplink BWP and the default downlink BWP differs from the active downlink BWP.

In some examples of the method, apparatuses, and non-transitory computer-readable medium described herein, communicating using the default BWP may include operations, features, means, or instructions for communicating, in the full duplex mode, using the default BWP that includes a default downlink BWP that differs from the active downlink BWP, and using the active uplink BWP.

In some examples of the method, apparatuses, and non-transitory computer-readable medium described herein, a guard band between the default downlink BWP and the active uplink BWP satisfies a threshold.

In some examples of the method, apparatuses, and non-transitory computer-readable medium described herein, communicating using the default BWP may include operations, features, means, or instructions for communicating, in the full duplex mode, using the default BWP that includes a default downlink BWP and a default uplink BWP, the default downlink BWP differs from the active downlink BWP and the default uplink BWP differs from the active uplink BWP.

In some examples of the method, apparatuses, and non-transitory computer-readable medium described herein, a guard band between the default downlink BWP and the default uplink BWP satisfies a threshold.

Some examples of the method, apparatuses, and non-transitory computer-readable medium described herein may further include operations, features, means, or instructions for communicating, prior to expiration of the inactivity time period, in the half-duplex mode using the active BWP, the active BWP including an active uplink BWP and an active downlink BWP.

In some examples of the method, apparatuses, and non-transitory computer-readable medium described herein, communicating using the default BWP may include operations, features, means, or instructions for communicating, in the half-duplex mode, using the default BWP that includes a default uplink BWP and a default downlink BWP, the default uplink BWP differs from the active uplink BWP and the default downlink BWP differs from the active downlink BWP.

In some examples of the method, apparatuses, and non-transitory computer-readable medium described herein, communicating using the default BWP may include operations, features, means, or instructions for communicating, in the full duplex mode, using the default BWP that includes a default downlink BWP, the default downlink BWP differs from the active downlink BWP.

In some examples of the method, apparatuses, and non-transitory computer-readable medium described herein, communicating using the default BWP may include operations, features, means, or instructions for communicating, in the full duplex mode, using the default BWP that includes a default uplink BWP, the default uplink BWP differs from the active uplink BWP.

In some examples of the method, apparatuses, and non-transitory computer-readable medium described herein, transmitting the control signaling may include operations, features, means, or instructions for transmitting the control signaling that indicates the default BWP that includes a first default BWP associated with the half-duplex mode and the default BWP that includes a second default BWP associated with the full duplex mode, and communicating in one of the half-duplex mode or the full duplex mode subsequent to expiration of the inactivity time period based on the control signaling.

In some examples of the method, apparatuses, and non-transitory computer-readable medium described herein, transmitting the control signaling may include operations, features, means, or instructions for transmitting the control signaling that indicates the default BWP and a default operation mode, and communicating, subsequent to expiration of the inactivity time period, in the default operation mode based on the control signaling.

In some examples of the method, apparatuses, and non-transitory computer-readable medium described herein, the default operation mode includes the half-duplex mode or the full duplex mode.

DETAILED DESCRIPTION

Figure 1:
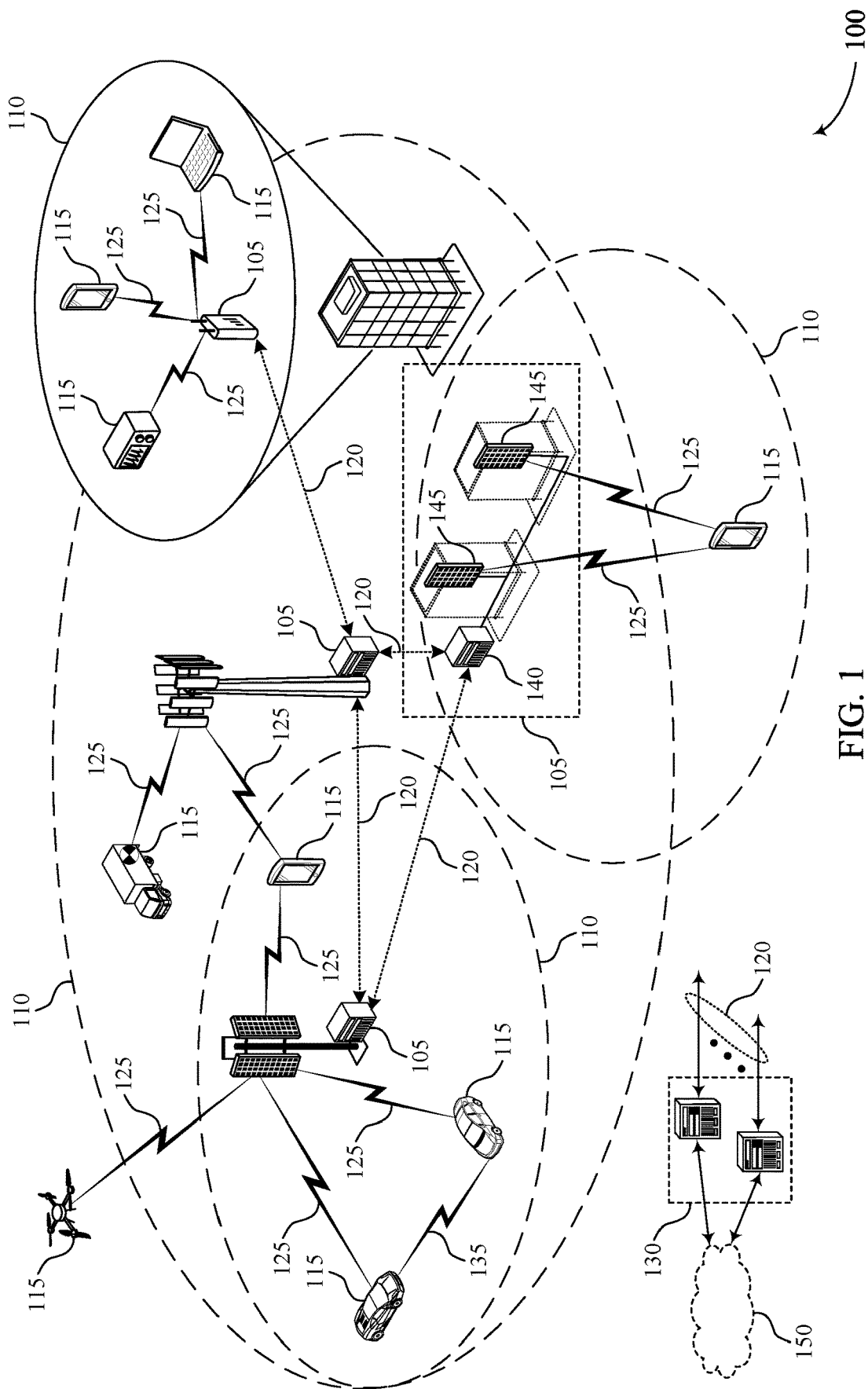
FIG. 1 illustrates an example of a system for wireless communications that supports bandwidth part (BWP) switching techniques for wireless communications systems in accordance with aspects of the present disclosure.

In some wireless communications systems, a user equipment (UE) may communicate with a base station over time frequency resources, such as one or more bandwidth parts (BWPs). For example, the UE may receive downlink control information (DCI) from the base station indicating an active BWP for receiving a downlink communication (e.g., a physical downlink shared channel (PDSCH) transmission) or for transmitting an uplink communication (e.g., a physical uplink shared channel (PUSCH) transmission). In some examples, the UE may communicate using an active uplink BWP, an active downlink BWP, or both over a paired spectrum using a full duplex mode (e.g., a frequency division duplexing (FDD) operating mode). For example, in a FDD mode, the active uplink BWP and the active downlink BWP may be configured separately (e.g., the active uplink BWP and the active downlink BWP may use the same time resources but different frequency operating bands). In some examples, when in a full duplex mode (e.g., a FDD mode), the uplink and downlink portions of a band may be frequency division multiplexed (e.g., the portions may use the same time resources but different frequency resources), the uplink and downlink portions may overlap in frequency resources (e.g., the portions may not have a guard band between each other, the portions may fully or partially overlap the same frequency resources, etc.), or a combination thereof. In some examples, a full duplex mode may be referred to as a FDD mode, or a FDD mode may be referred to as a full duplex mode.

Additionally or alternatively, the UE may communicate using an active uplink BWP, an active downlink BWP, or both over an unpaired spectrum using a half-duplex mode (e.g., a time division duplexing (TDD) operating mode). For example, in a TDD mode, the active uplink BWP and the active downlink BWP may be configured jointly (e.g., the active uplink BWP and the active downlink BWP may use the same frequency operating band and different time resources). In some examples, a half-duplex mode may be referred to as a TDD mode, or a TDD mode may be referred to as a half-duplex mode. In some examples, the UE may be capable of operating in the full duplex mode (e.g., FDD mode) on a single carrier in an unpaired spectrum as described herein. Techniques for BWP switching procedures that account for such various operating modes and BWP configurations may be desired.

According to the techniques described herein, a UE or a base station may perform BWP switching in accordance with one or more operation modes of the UE (e.g., a full duplex mode, a half-duplex mode, an FDD operation mode, a TDD operation mode, or any combination thereof), one or more active BWP configurations for communications, one or more default BWP configurations for communications, or any combination thereof. For example, the UE may transmit a control message to a base station indicating a capability of the UE to operate in a FDD mode on a single carrier in an unpaired radio frequency spectrum. The base station may transmit control signaling to the UE based on the indicated capability of the UE to operate in a FDD mode on a single carrier in an unpaired radio frequency spectrum. In some examples, the control signaling may indicate (e.g., configure) the UE with one or more default BWPs associated with one or more operation modes. For example, the control signaling may indicate a default uplink BWP and a default downlink BWP for operation in the TDD mode. In such examples, the default uplink BWP and the default downlink BWP may correspond to a same BWP identification (ID), a same numerology, a same frequency operating band, or a combination thereof. Additionally or alternatively, the control signaling may indicate a default uplink BWP and a default downlink BWP for operation in the FDD mode. In such examples, the default uplink BWP and the default downlink BWP may be configured independently for each UE-specific serving cell per component carrier (CC) (e.g., each BWP may correspond to different frequency operating bands, different BWP IDs, different numerologies, or a combination thereof). In some cases, the control signaling may indicate default BWPs for both modes. For example, the control signaling may configure the UE with a default uplink BWP and a default downlink BWP for the TDD mode and a default uplink BWP and a default downlink BWP for the FDD mode.

The UE and the base station may communicate using one or more active BWPs associated with an operation mode. For example, the UE may receive DCI indicating an active uplink BWP, an active downlink BWP, or both. In some examples, an inactivity timer associated with the active BWP may expire (e.g., the UE may fail to receive DCI via the active BWP for a threshold time period). Upon expiration of the inactivity timer, the UE may switch from an active BWP associated with an operation mode (e.g., a TDD mode or a FDD mode) to a default BWP associated with an operation mode (e.g., a TDD mode or a FDD mode) in accordance with the BWP schemes described herein.

As an illustrative example, the UE and the base station may communicate using active BWPs in accordance with an FDD mode. In some examples, upon expiration of the inactivity timer, the UE or the base station may start operating in the TDD mode and switch the active BWPs to default BWPs (e.g., an uplink BWP and a downlink BWP) associated with the TDD mode. In some other examples, the UE may continue operating in the FDD mode and switch one or more BWPs to one or more default BWPs associated with the FDD mode. For example, the UE may identify that an inactivity timer (e.g., an inactivity timer associated with an active downlink BWP or an inactivity timer associated with an active uplink BWP) has expired and the UE may switch the active downlink BWP to the default downlink BWP associated with the FDD mode. Additionally or alternatively, the UE may switch an active uplink BWP to the default uplink BWP, for example, based on an expiration of the inactivity timer associated with the active downlink BWP or an expiration of an inactivity timer associated with the active uplink BWP.

As another illustrative example, the UE and the base station may communicate using active BWPs in accordance with a TDD mode. In some examples, upon expiration of the inactivity timer, the UE may switch the active BWPs to default BWPs (e.g., an uplink BWP and a downlink BWP) associated with the TDD mode. In some other examples, the UE may switch the active BWPs to default BWPs associated with the FDD mode. In some examples, the UE may receive control signaling indicating a default operation mode (e.g., the TDD mode or the FDD mode). In such examples, the UE may switch active BWPs to default BWPs associated with the default operation mode (e.g., active BWPs associated with either the FDD mode or the TDD mode may be switched to default BWPs associated with the default mode).

Aspects of the disclosure are initially described in the context of wireless communications systems. Aspects of the disclosure are then described in the context of BWP switching schemes and process flows. Aspects of the disclosure are further illustrated by and described with reference to apparatus diagrams, system diagrams, and flowcharts that relate to BWP switching techniques for wireless communications systems.

FIG. 1 illustrates an example of a wireless communications system 100 that supports BWP switching techniques for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, a UE 115 may communicate with a base station 105 over time frequency resources, such as one or more BWPs. For example, the UE 115 may receive DCI from the base station 105 indicating an active BWP for receiving a downlink communication (e.g., a physical downlink shared channel (PDSCH) transmission) or for transmitting an uplink communication (e.g., a physical uplink shared channel (PUSCH) transmission). In some examples, the UE 115 may communicate using an active uplink BWP, an active downlink BWP, or both over a paired spectrum using an FDD mode. For example, the active uplink BWP and the active downlink BWP may be configured separately (e.g., the active uplink BWP and the active downlink BWP may use the same time resources but different frequency operating bands). Additionally or alternatively, the UE 115 may communicate using an active uplink BWP, an active downlink BWP, or both over an unpaired spectrum using a TDD mode. For example, the active uplink BWP and the active downlink BWP may be configured jointly (e.g., the active uplink BWP and the active downlink BWP may use the same frequency operating band and different time resources).

In some examples, communications between the various devices in the wireless communications system 100 may involve switching BWPs. In general, BWP switching may be done through dynamic activation (e.g., receiving a DCI that explicitly indicates that a UE 115 is to switch BWPs) or may be timer-based. If the BWP switching is timer-based, the UE 115 may switch from an active BWP to a default BWP. In some cases, the default BWP may be an initial active BWP, such as a BWP the UE 115 was using prior to the active BWP (e.g., a BWP used for communications prior to receiving DCI indicating to switch to the active BWP).

In some examples, such timer-based switching may be an example of FDD-based or TDD-based BWP switching. If the UE 115 performs FDD-based BWP switching, the UE 115 may start a timer when it switches its active downlink BWP to a downlink BWP other than the default BWP. The UE may restart the timer to the initial value when it successfully decodes a DCI to schedule PDSCH in its active downlink BWP. The UE may switch its active downlink BWP to the default BWP when the timer expires. For TDD-based BWP switching, a UE may start a timer when it switches its active downlink and uplink BWP pair to another downlink and uplink BWP pair other than the default downlink and uplink BWP pair. The UE may restart the timer to the initial value when it successfully decodes a DCI to schedule PDSCH, PUSCH, or both, in its active downlink and uplink BWP pair. The UE 115 may switch its active downlink and uplink BWP pair to the default downlink and uplink BWP when the timer expires. The timer may have a granularity of 1 ms (e.g., a subframe) for sub-6 GHz and may have a granularity of 0.5 ms (e.g., half a sub-frame) for above-6 GHz. Additionally, the timer may have a maximum time length (e.g., 50 ms).

According to various aspects of the present disclosure, a UE 115 or a base station 105 may perform BWP switching in accordance with one or more operation modes (e.g., an FDD operation mode, a TDD operation mode, or both), one or more active BWP configurations for communications, one or more default BWP configurations for communications, or any combination thereof. For example, the UE 115 may transmit a control message to the base station 105 indicating a capability of the UE 115 to operate in an FDD mode on a single carrier in an unpaired radio frequency spectrum. The base station may transmit control signaling to the UE 115 based on the indicated capability of the UE 115 to operate in an FDD mode on a single carrier in an unpaired radio frequency spectrum. In some examples, the control signaling may indicate (e.g., configure) the UE 115 with one or more default BWPs associated with one or more operation modes. For example, the control signaling may indicate a default uplink BWP and a default downlink BWP for operation in the TDD mode. In such examples, the default uplink BWP and the default downlink BWP may correspond to a same BWP ID, a same numerology, a same frequency operating band, or a combination thereof. Additionally or alternatively, the control signaling may indicate a default uplink BWP and a default downlink BWP for operation in the FDD mode. In such examples, the default uplink BWP and the default downlink BWP may be configured independently for each UE-specific serving cell per CC (e.g., each BWP may correspond to different frequency operating bands, different BWP IDs, different numerologies, or a combination thereof). In some cases, the control signaling may indicate default BWPs for both modes. For example, the control signaling may configure the UE 115 with a default uplink BWP and a default downlink BWP for the TDD mode and a default uplink BWP and a default downlink BWP for the FDD mode.

The UE 115 and the base station 105 may communicate using one or more active BWPs associated with an operation mode. For example, the UE 115 may receive DCI indicating an active uplink BWP, an active downlink BWP, or both. In some examples, an inactivity timer associated with the active BWP may expire (e.g., the UE 115 may fail to receive DCI via the active BWP for a threshold time period). Upon expiration of the inactivity timer, the UE 115 or the base station 105 may switch from an active BWP associated with an operation mode (e.g., a TDD mode or a FDD mode) to a default BWP associated with an operation mode (e.g., a TDD mode or a FDD mode) in accordance with the BWP schemes described herein.

Figure 2:
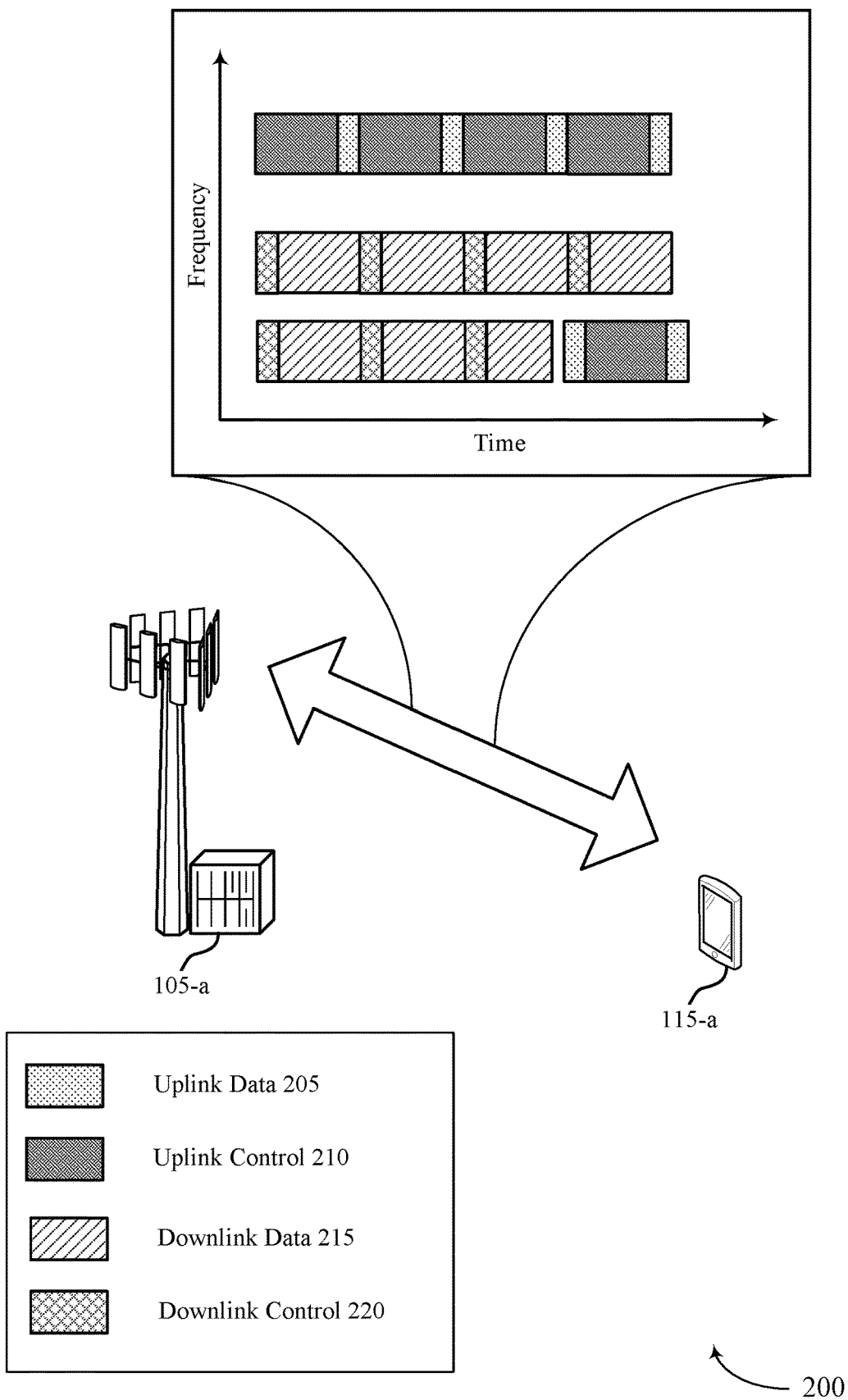
FIG. 2 illustrates an example of a wireless communications system that supports BWP switching techniques for wireless communications systems in accordance with aspects of the present disclosure.

FIG. 2 illustrates an example of a wireless communications system 200 that supports BWP switching techniques for wireless communications systems in accordance with aspects of the present disclosure. In some examples, the wireless communications system 200 may implement aspects of the wireless communication system 100. For example, wireless communications system 200 may include UE 115-*a* and base station 105-*a*, which may be examples of UEs 115 and base stations 105 as described with reference to FIG. 1.

In some examples, the UE 115-*a* may communicate with a base station 105-*a* over time frequency resources, such as one or more BWPs used for transmitting or receiving data over one or more allocated regions (e.g., via uplink data 205, uplink control data 210, downlink data 215, downlink control 220, or any combination thereof). For example, the UE 115-*a* may receive DCI from the base station 105 (e.g., via downlink control 220) indicating an active BWP for receiving a downlink communication (e.g., a PDSCH transmission via the downlink data 215) or for transmitting an uplink communication (e.g., a PUSCH transmission via the uplink data 205). In some examples, the UE 115-*a* may communicate using an active uplink BWP, an active downlink BWP, or both over a paired spectrum using an FDD mode. For example, the active uplink BWP and the active downlink BWP may be configured separately (e.g., the active uplink BWP and the active downlink BWP may use the same time resources but different frequency operating bands). Additionally or alternatively, the UE 115-*a* may communicate using an active uplink BWP, an active downlink BWP, or both over an unpaired spectrum using a TDD mode. For example, the active uplink BWP and the active downlink BWP may be configured jointly (e.g., the active uplink BWP and the active downlink BWP may use the same frequency operating band and different time resources).

In some examples, communications between the various devices in the wireless communications system 100 may involve switching BWPs. In general, BWP switching may be done through dynamic activation (e.g., receiving a DCI that explicitly indicates that a UE 115-*a* is to switch BWPs) or may be timer-based. If the BWP switching is timer-based, the UE 115-*a* may switch from an active BWP to a default BWP. In some cases, the default BWP may be an initial active BWP, such as a BWP the UE 115-*a* was using prior to the active BWP (e.g., a BWP used for communications prior to receiving DCI indicating to switch to the active BWP).

In some examples, such timer-based switching may be an example of FDD-based or TDD-based BWP switching. If the UE 115-*a* performs FDD-based BWP switching, the UE 115-*a* may start a timer when it switches its active downlink BWP to a downlink BWP other than the default BWP. The UE may restart the timer to the initial value when it successfully decodes a DCI to schedule PDSCH in its active downlink BWP. The UE may switch its active downlink BWP to the default BWP when the timer expires. For TDD-based BWP switching, a UE may start a timer when it switches its active downlink and uplink BWP pair to another downlink and uplink BWP pair other than the default downlink and uplink BWP pair. The UE may restart the timer to the initial value when it successfully decodes a DCI to schedule PDSCH or PUSCH in its active downlink and uplink BWP pair. The UE 115-*a* may switch its active downlink and uplink BWP pair to the default downlink and uplink BWP when the timer expires.

The UE 115-*a* or the base station 105-*a* may perform BWP switching in accordance with one or more operation modes (e.g., an FDD operation mode, a TDD operation mode, or both), one or more active BWP configurations for communications, one or more default BWP configurations for communications, or any combination thereof. For example, the UE 115-*a* may transmit a control message to the base station 105-*a* indicating a capability of the UE 115-*a* to operate in an FDD mode on a single carrier in an unpaired radio frequency spectrum. The base station may transmit control signaling to the UE 115-*a* based on the indicated capability of the UE 115-*a* to operate in an FDD mode on a single carrier in an unpaired radio frequency spectrum. In some examples, the control signaling may indicate (e.g., configure) the UE 115-*a* with one or more default BWPs associated with one or more operation modes. For example, the control signaling may indicate a default uplink BWP and a default downlink BWP for operation in the TDD mode. In such examples, the default uplink BWP and the default downlink BWP may correspond to a same BWP ID, a same numerology, a same frequency operating band, or a combination thereof. Additionally or alternatively, the control signaling may indicate a default uplink BWP and a default downlink BWP for operation in the FDD mode. In such examples, the default uplink BWP and the default downlink BWP may be configured independently for each UE-specific serving cell per CC (e.g., each BWP may correspond to different frequency operating bands, different BWP IDs, different numerologies, or a combination thereof). In some cases, the control signaling may indicate default BWPs for both modes. For example, the control signaling may configure the UE 115-*a* with a default uplink BWP and a default downlink BWP for the TDD mode and a default uplink BWP and a default downlink BWP for the FDD mode.

The UE 115-*a* and the base station 105-*a* may communicate using one or more active BWPs associated with an operation mode. For example, the UE 115-*a* may receive DCI indicating an active uplink BWP, an active downlink BWP, or both. In some examples, an inactivity timer associated with the active BWP may expire (e.g., the UE 115-*a* may fail to receive DCI via the active BWP for a threshold time period). Upon expiration of the inactivity timer, the UE 115-*a* or the base station 105-*a* may switch from an active BWP associated with an operation mode (e.g., a TDD mode or a FDD mode) to a default BWP associated with an operation mode (e.g., a TDD mode or a FDD mode) in accordance with the BWP schemes described herein.

As an illustrative example, the UE 115-*a* and the base station 105-*a* may communicate using active BWPs in accordance with an FDD mode. In some examples, upon expiration of the inactivity timer, the UE 115-*a* or the base station 105-*a* may start operating in the TDD mode and switch the active BWPs to default BWPs (e.g., an uplink BWP and a downlink BWP) associated with the TDD mode. In some other examples, the UE 115-*a* may continue operating in the FDD mode and switch one or more BWPs to one or more default BWPs associated with the FDD mode. For example, the UE 115-*a* may identify that an inactivity timer (e.g., an inactivity timer associated with an active downlink BWP or an inactivity timer associated with an active uplink BWP) has expired and the UE 115-*a* may switch the active downlink BWP to the default downlink BWP associated with the FDD mode. Additionally or alternatively, the UE 115-*a* may switch an active uplink BWP to the default uplink BWP, for example, based on an expiration of the inactivity timer associated with the active downlink BWP or an expiration of an inactivity timer associated with the active uplink BWP.

As another illustrative example, the UE 115-*a* and the base station 105-*a* may communicate using active BWPs in accordance with a TDD mode. In some examples, upon expiration of the inactivity timer, the UE 115-*a* may switch the active BWPs to default BWPs (e.g., an uplink BWP and a downlink BWP) associated with the TDD mode. In some other examples, the UE 115-*a* may switch the active BWPs to default BWPs associated with the FDD mode. In some examples, the UE 115-*a* may receive control signaling indicating a default operation mode (e.g., the TDD mode or the FDD mode). In such examples, the UE 115-*a* may switch active BWPs to default BWPs associated with the default operation mode (e.g., active BWPs associated with either the FDD mode or the TDD mode may be switched to default BWPs associated with the default mode).

Figure 3:
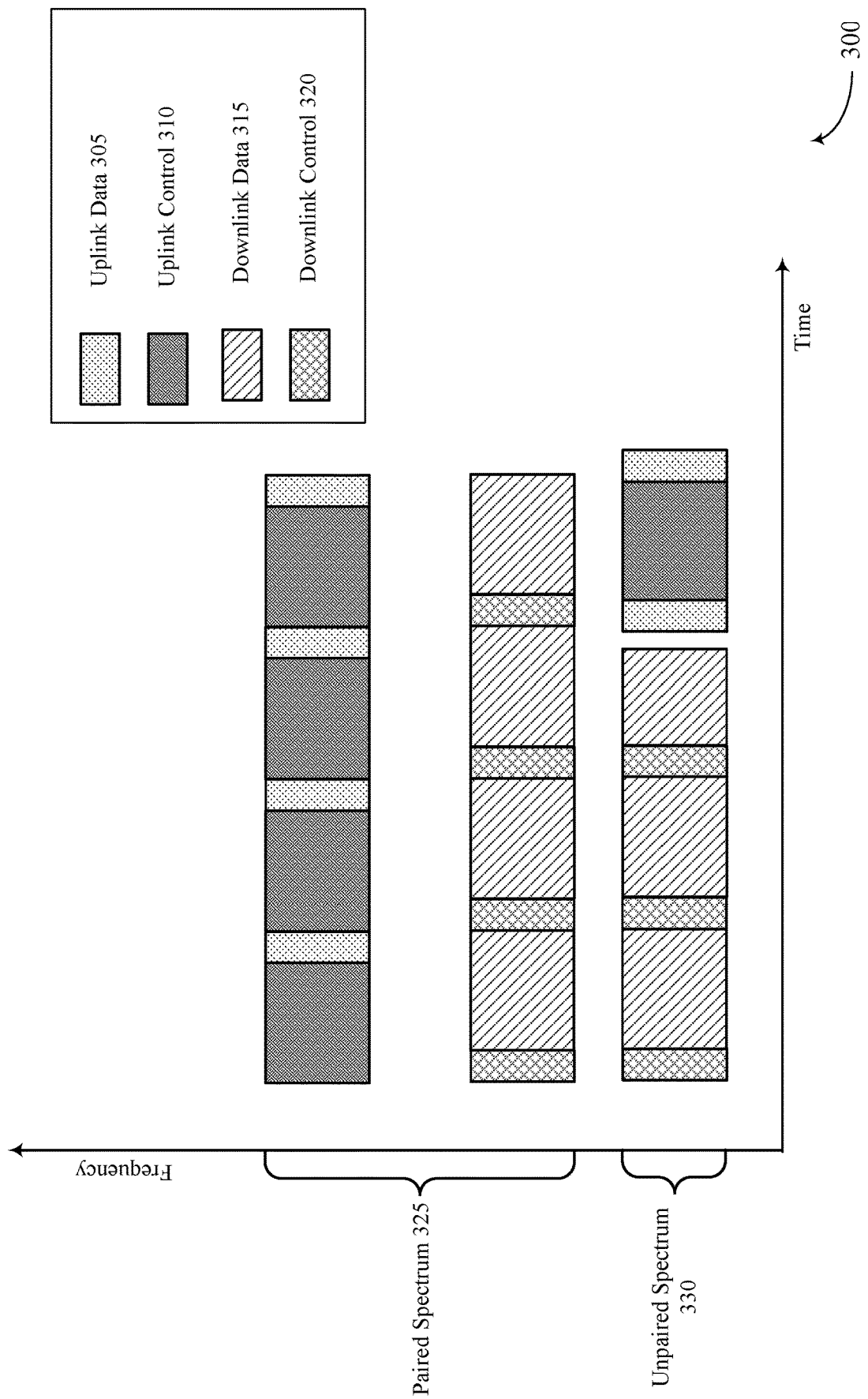
FIGS. 3 and 4 illustrate examples of BWP switching schemes that support BWP switching techniques for wireless communications systems in accordance with aspects of the present disclosure.

FIG. 3 illustrates an example of a BWP switching scheme 300 that supports BWP switching techniques for wireless communications systems in accordance with aspects of the present disclosure. In some examples, the BWP switching scheme 300 may implement aspects of wireless communication system 100. For example, the BWP switching scheme 300 may illustrate communications between a UE 115 and a base station 105, which may be examples of UEs 115 and base stations 105 as described with reference to FIGS. 1 and 2. Generally, the BWP switching scheme 300 may illustrate an example of communications via a paired spectrum 325 and an unpaired spectrum 330.

A UE and a base station may communicate over resources, such as BWPs illustrated by the BWP switching scheme 300. As an illustrative example, the UE may transmit data to the base station via one or more regions of a BWP, such as uplink data 305 regions and uplink control 310 regions. Additionally or alternatively, the UE may receive data from the base station via one or more regions of a BWP, such as downlink data 315 regions and downlink control 320 regions. In some examples, an active BWP (or a default BWP) for communications may be indicated to the UE via DCI. For example, the base station may indicate one or more BWP IDs corresponding to BWPs used for communications between the UE and the base station (e.g., the network may configure BWPs with consecutive IDs starting from 1 and indicate the ID of BWPs to be used for communications, and an ID value of 0 may correspond to the default or initial BWP).

In some examples, the UE and the base station may use a paired spectrum 325 for communications. In some examples, the paired spectrum 325 may refer to radio frequency spectrum that includes multiple (e.g., two) different frequency bands (e.g., a first frequency band allocated for uplink communications may be paired with a second frequency band allocated for downlink communications, for example, using an FDD mode). For example, a first component carrier for downlink communications may be utilized in a first frequency band, and a second component carrier may be utilized for uplink communications in a second, different frequency band. The different frequency bands may be used for simultaneous uplink and downlink communication via the different bands. For example, the paired spectrum 325 may include a first BWP for uplink communications and a second BWP for downlink communications. As illustrated, the first BWP and the second BWP may be implemented for an FDD operation mode. The first BWP may include a first operating frequency band (e.g., 1920 MHz-1980 MHz, among other examples) and the devices may transmit or receive uplink communications during a time period over the frequency band. The second BWP may include a second operating frequency band different than the first operating frequency band (e.g., 2110 MHz-2170 MHz), and the devices may transmit or receive downlink communications during the same time period over the second frequency band. In some examples, the downlink BWP and the uplink BWP may be configured separately (e.g., independently) for each UE-specific serving cell per CC, for example, for use in an FDD mode. For example, the UE may be configured with a downlink BWP configuration that indicates a numerology for physical downlink control channel (PDCCH) communications and PDSCH communications. The UE may, additionally or alternatively, be configured with an uplink BWP configuration that indicates a numerology for physical uplink control channel (PUCCH) communications and PUSCH communications. The downlink BWP configuration and the uplink BWP configuration may be separately configured at the UE, and thus one or more parameters indicated by the configurations may be different (e.g., BWP IDs, numerologies, frequency bands, etc., may vary or may be the same for each configuration). In some examples, the BWPs may be separated by a range of frequency, for example, to mitigate interference between communications across BWPs (e.g., a guard band between the first BWP and the second BWP).

Additionally or alternatively, the UE and the base station may use the unpaired spectrum 330 for communications. In some examples, the unpaired spectrum 330 may refer to a single frequency band allocated for both uplink and downlink communications (e.g., the single frequency band may be allocated for both uplink communications and downlink communications, for example, using a TDD mode or FDD mode). For example, the frequency band (e.g., frequency range) used for uplink communications may be the same as the frequency band used for downlink communications, for example, in accordance with a TDD mode. In some cases, multiple different bandwidth parts may be defined within the single frequency band to permit simultaneous uplink and downlink communication for a UE operating in FDD mode. In some examples, the BWP configured for uplink communications may have the same ID as the BWP configured for downlink communications, the BWP configured for uplink communications may share a numerology with the BWP configured for downlink communications, etc. In some examples, the UE and the base station may implement a TDD mode for the unpaired spectrum 330. In such examples, regions for uplink communications (e.g., uplink data 305, uplink control 310) may alternate in time with regions for downlink communications (e.g., downlink data 315, downlink control 320). The uplink BWP and the downlink BWP for the TDD mode may be jointly configured as a BWP pair per CC. In some examples, the uplink BWP and downlink BWP pair may share the same center frequency in an operating band (e.g., 2300 MHz-2400 MHz, among other examples) but may include different bandwidth ranges for each UE specific serving cell for a UE.

The UE or the base station may perform BWP switching in accordance with one or more operation modes (e.g., a full duplex mode such as an FDD operation mode, a half-duplex mode such as a TDD operation mode, or any combination thereof), one or more active BWP configurations for communications, one or more default BWP configurations for communications, or any combination thereof, as described herein. For example, the UE may transmit a control message to the base station indicating a capability of the UE to operate in a full duplex mode (e.g., a FDD mode where an uplink portion of a band, such as an uplink BWP, may use different frequency resources or overlapping frequency resources during same time resources) on a single carrier in an unpaired radio frequency spectrum. The base station may transmit control signaling to the UE based on the indicated capability of the UE to operate in an FDD mode on a single carrier in an unpaired radio frequency spectrum. In some examples, the control signaling may indicate (e.g., configure) the UE with one or more default BWPs associated with one or more operation modes. For example, the control signaling may indicate a default uplink BWP and a default downlink BWP for operation in the TDD mode, a default uplink BWP and a default downlink BWP for operation in the TDD mode, or both.

The UE and the base station may communicate using one or more active BWPs associated with an operation mode. For example, the UE may receive DCI indicating an active uplink BWP, an active downlink BWP, or both. In some examples, an inactivity timer associated with the active BWP may expire (e.g., the UE may fail to receive DCI via the active BWP for a threshold time period). Upon expiration of the inactivity timer, the UE or the base station may switch from an active BWP associated with an operation mode (e.g., a TDD mode or a FDD mode) to a default BWP associated with an operation mode (e.g., a TDD mode or a FDD mode).

Figure 4:
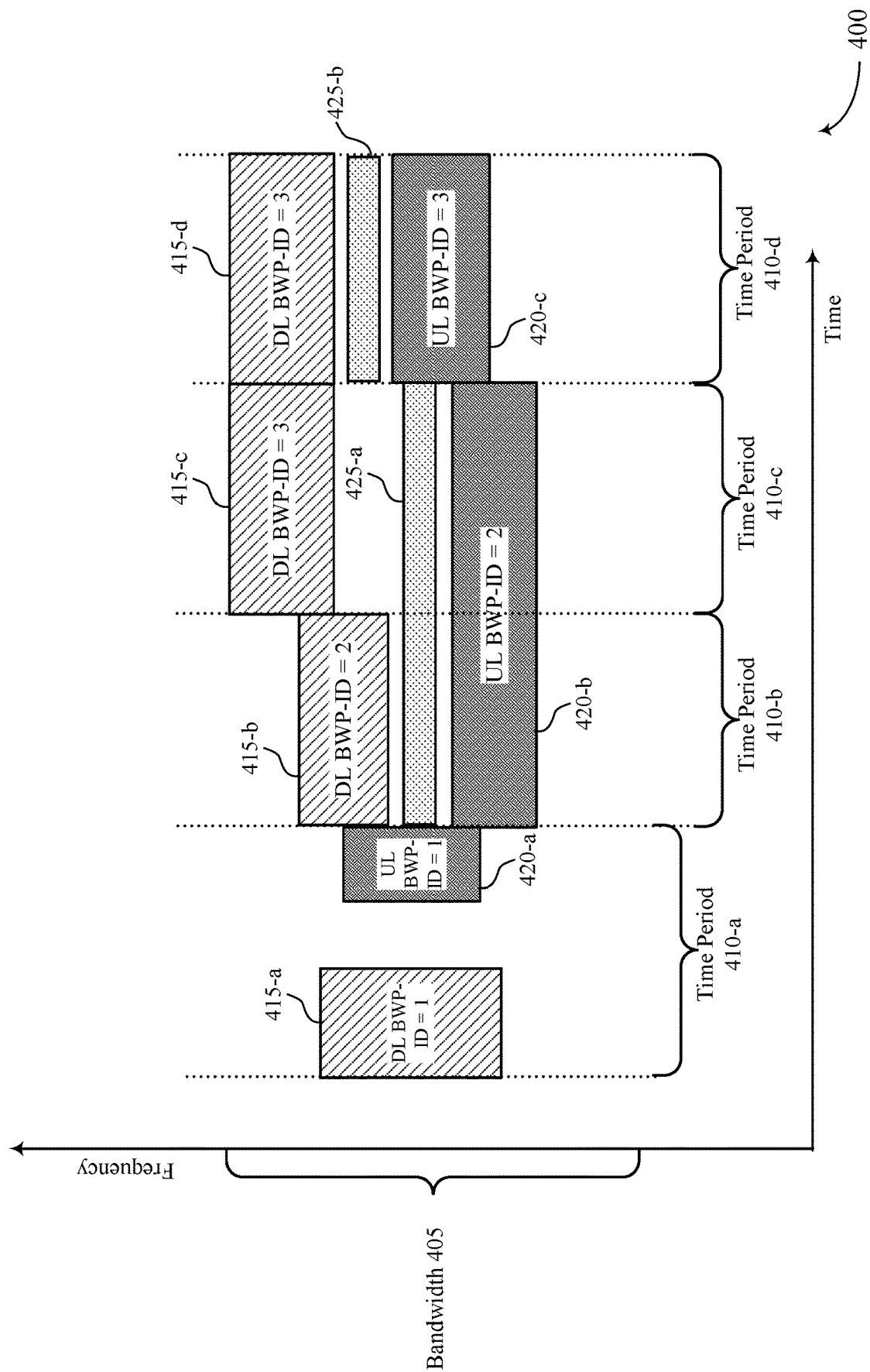

FIG. 4 illustrates an example of a BWP switching scheme 400 that supports BWP switching techniques for wireless communications systems in accordance with aspects of the present disclosure. In some examples, the BWP switching scheme 400 may implement aspects of wireless communications systems 100 and 200 and the BWP switching scheme 300. For example, the BWP switching scheme 400 may illustrate communications between a UE 115 and a base station 105, which may be examples of UEs 115 and base stations 105 as described with reference to FIGS. 1 through 3. Generally, the BWP switching scheme 400 may illustrate an example of communications supported by a capability of the UE to operate in an FDD mode (or a TDD mode) in an unpaired spectrum band. For example, the bandwidth 405 may be an example of the single carrier in the unpaired spectrum, and the UE may have a capability to implement FDD mode communications as illustrated in the time periods 410-b, 410-c, and 410-d on the single carrier in the unpaired spectrum (e.g., the UE may communicate using independently configured downlink BWPs 415 and uplink BWPs 420 that have different frequency ranges within the unpaired spectrum).

A UE may be enabled to operate in an FDD mode on a single carrier in an unpaired spectrum, such as the bandwidth 405. The UE may indicate a capability of the UE to operate in the FDD mode (and/or a TDD mode) on the single carrier in an unpaired spectrum (e.g., the UE may transmit a control message to the base station via a PUCCH indicating the capability). The bandwidth 405 may include downlink BWPs 415 and uplink BWPs 420 in accordance with various duplexing operations modes. For example, the UE and the base station may communicate in accordance with a TDD mode during the time period 410-a and an FDD mode during the time periods 410-b, 410-c, and 410-d.

In some examples, the uplink BWPs 420 and downlink BWPs 415 may have different BWP IDs and/or other different parameters (e.g., different subcarrier spacing (SCS)). In some examples, a UE may be configured with pairs of uplink BWPs 420 and downlink BWPs 415. In such examples, the pairs of BWPs may have the same BWP ID, and the same or different SCS and center frequencies for each pair of uplink/downlink BWPs.

As illustrated, the time period 410-a may illustrate an example of a TDD operation mode where the downlink BWP 415-a and the uplink BWP 420-a have a same BWP ID (e.g., DL BWP-ID=1, UL BWP-ID=1). The time period 410-b may illustrate an example of an FDD operation mode where the downlink BWP 415-b and the uplink BWP 420-b have a same BWP ID (e.g., DL BWP-ID=2, UL BWP-ID=2). The time period 410-c may illustrate an example of an FDD operation mode where the downlink BWP 415-c and the uplink BWP 420-c have different BWP IDs (e.g., DL BWP-ID=3, UL BWP-ID=2). The time period 410-d may illustrate an example of an FDD operation mode where the downlink BWP 415-d and the uplink BWP 420-d have a same BWP ID (e.g., DL BWP-ID=3, UL BWP-ID=3). The various BWP switching configurations illustrated by the BWP switching scheme 400 may include frequency gaps (e.g., guard bands) between downlink BWPs 415 and uplink BWPs 420, for example, in the FDD mode. Such configurations may ensure that a threshold gap is satisfied (e.g., the guard band between a downlink BWP 415-b and an uplink BWP 420-b may satisfy a minimum guard band 425-a, the guard band between a downlink BWP 415-d and an uplink BWP 420-*d* may satisfy a minimum guard band 425-*b*, etc.). In other words, a UE may determine that a minimum guard band 425 between an uplink BWP 420 and a downlink BWP 415 is satisfied based on a BWP switching configuration. In some examples, although shown with a guard band between the downlink BWPs 415 and uplink BWPs 420 in a FDD mode (e.g., a full duplex mode), it is to be understood that in some examples of full duplex operation (or half-duplex operation, such as a TDD mode) the uplink BWPs 420 and the downlink BWPs 415 may partially or fully overlap frequency resources (e.g., without a guard band).

In some examples, the UE and/or the base station may implement timer-based BWP switching as described herein. The UE may identify a default BWP. For example, the base station may indicate an ID for a default BWP (e.g., a downlink BWP), or the UE may use an initial BWP as a default BWP. In some examples, the UE may implement a dedicated timer for timer-based active BWP switching from an active BWP to a default BWP (e.g., in NR systems). For example, the UE may operate in an FDD mode and the UE may start a timer (e.g., bwp-Inactivity Timer) when the UE switches to an active BWP (e.g., a BWP different than the default BWP). The UE may restart the timer to an initial value (e.g., 0) if the UE successfully decodes DCI scheduling a PDSCH communication or a PUSCH communication in the active BWP. The UE may switch the active BWP to a default BWP upon expiration of the timer. In an unpaired spectrum, the UE may start the timer when it switches to an active BWP pair (e.g., a downlink BWP and a corresponding uplink BWP). The UE may restart the timer to an initial value (e.g., 0) if the UE successfully decodes DCI scheduling a PDSCH communication or a PUSCH communication in the active BWP pair. The UE may switch the active BWP pair to a default BWP pair upon expiration of the timer. In some examples, for a UE indicating a capability of full-duplex FDD operation, changing the downlink BWP may result in a change of the uplink BWP as well, or vice versa.

Figure 5A:
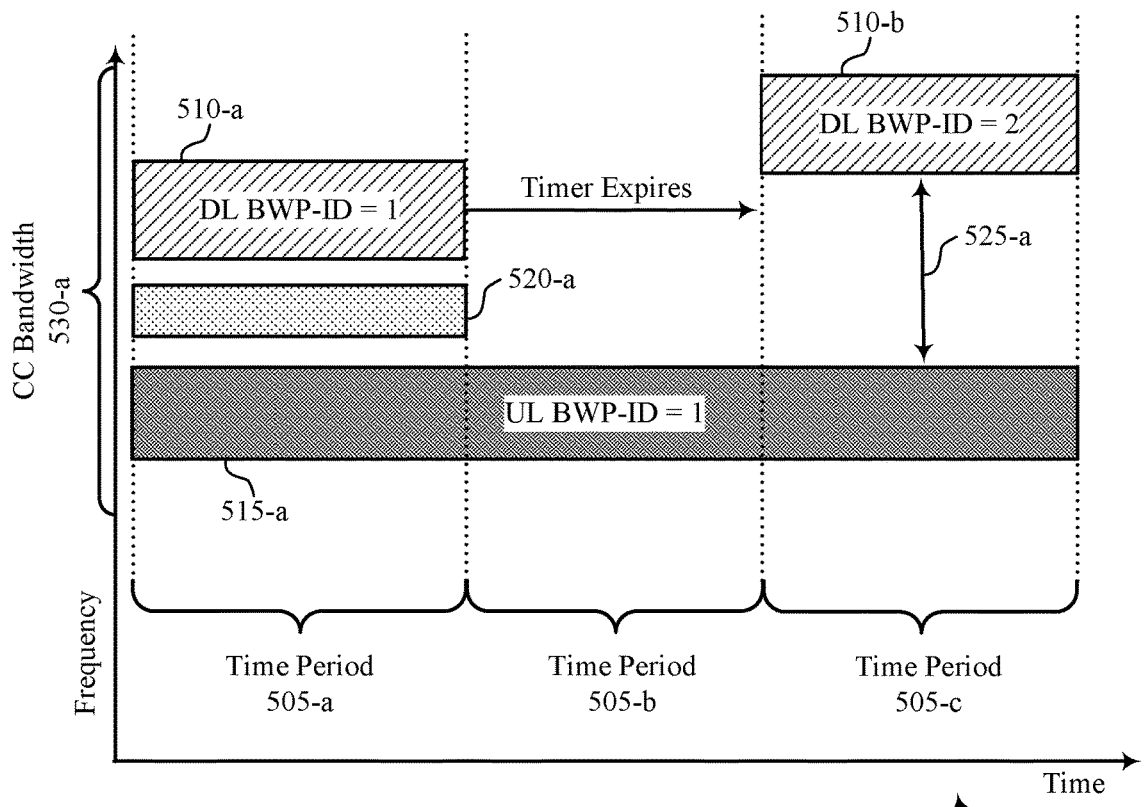
FIGS. 5A and 5B illustrate examples of BWP switching schemes that support BWP switching techniques for wireless communications systems in accordance with aspects of the present disclosure.

FIG. 5A illustrates an example of a BWP switching scheme 500 that supports BWP switching techniques for wireless communications systems in accordance with aspects of the present disclosure. In some examples, the BWP switching scheme 500 may implement aspects of wireless communication system 100. In some examples, the BWP switching scheme 500 may implement aspects of wireless communications systems 100 and 200 and the BWP switching schemes 300 and 400. For example, the BWP switching scheme 500 may illustrate communications between a UE 115 and a base station 105, which may be examples of UEs 115 and base stations 105 as described with reference to FIGS. 1 through 4. Generally, the BWP switching scheme 500 may illustrate an example of BWP switching in accordance with the techniques described herein.

A UE may determine that the UE is enabled to operate in an FDD mode on a single carrier in an unpaired radio frequency spectrum. For example, the BWP switching scheme 500 and the BWP switching scheme 501 may illustrate examples of communications supported by a capability of the UE to operate in an FDD mode (and/or a TDD mode) in an unpaired spectrum band. For example, the CC bandwidth 530-*a* and the CC bandwidth 530-*b* may be examples of the single carrier in the unpaired spectrum, and a CC bandwidth 530 may support multiple BWPs (e.g., active and default downlink BWPs 510, active and default uplink BWPs 515) defined within the CC bandwidth 530. The UE may have a capability to implement FDD mode communications, as illustrated in the time periods 505, on the single carrier in the unpaired spectrum (e.g., the UE may communicate using independently configured downlink BWPs 510 and uplink BWPs 515 that have different frequency ranges within the CC bandwidth 530-*a* and the CC bandwidth 530-*b*).

The UE may transmit a control message to a base station indicating such a capability. The base station may configure the UE with one or more default BWPs in accordance with a BWP switching configuration. For example, the base station may transmit control signaling indicating (e.g., configuring) the UE with one or more default BWPs associated with one or more operation modes. As an illustrative example, the control signaling may indicate a default uplink BWP and a default downlink BWP for operation in the TDD mode. In such examples, the default uplink BWP and the default downlink BWP may correspond to a same BWP ID, a same numerology, a same frequency operating band (e.g., a same center frequency), or a combination thereof. Additionally or alternatively, the control signaling may indicate a default uplink BWP and a default downlink BWP for operation in the FDD mode. In such examples, the default uplink BWP and the default downlink BWP may be configured independently for each UE-specific serving cell per CC (e.g., each BWP may correspond to different frequency operating bands, each BWP may be associated with different or the same BWP IDs, different or the same numerologies, different or the same SCS, or a combination thereof, among other examples of BWP configuration parameters). In some examples, the control signaling may indicate default BWPs for both modes. For example, the control signaling may configure the UE with a default uplink BWP and a default downlink BWP for the TDD mode and a default uplink BWP and a default downlink BWP for the FDD mode.

In some examples, the UE may be configured with a default operation mode. For example, the control signaling may configure the UE with default BWPs (e.g., a default uplink BWP and a default downlink BWP) corresponding to a default operation mode. Additionally or alternatively, the control signaling may configure the UE with default BWPs corresponding to each mode and the control signaling may indicate the default operation mode (e.g., the TDD mode or the FDD mode may be indicated as a default operation mode).

The UE may perform BWP switching based on the control signaling. In some examples, the UE may be configured with a default operation mode and may switch to one or more default BWPs associated with the default operation mode upon expiration of a timer associated with at least one active BWP. For example, the UE may be communicating via an active downlink BWP in accordance with either an FDD mode or a TDD mode and may determine that DCI has not been received for a threshold time period. Accordingly, the UE may switch the active downlink BWP to a default BWP of a default operation mode (e.g., the FDD mode or the TDD mode), for example, regardless of the current operation mode prior to the expiration of the timer. As an illustrative example, the UE may communicate via an active BWP in accordance with an FDD mode and, upon expiration of an inactivity timer, the UE may switch the operation mode to the TDD mode (e.g., the TDD mode may be the default operation mode). The UE may switch the active downlink BWP and the active uplink BWP associated with the FDD mode to a default downlink BWP and default uplink BWP pair associated with the TDD mode (e.g., the default downlink BWP and default uplink BWP pair may have the same SCS, the same BWP-ID, the same center frequency, among other examples of parameters described herein).

In some examples, the UE may be configured with default BWPs corresponding to a TDD mode and default BWPs corresponding to an FDD mode. In such examples, the UE may determine to switch to the default BWP(s) associated with the operation mode utilized prior to the expiration of the timer. As an illustrative example, the UE may be communicating via an active BWP in accordance with a TDD mode and, upon expiration of the timer, the UE may switch the active BWP to a default BWP associated with the TDD mode (e.g., an active uplink BWP and an active downlink BWP pair may be switched to a default uplink BWP and a default downlink BWP pair).

As another illustrative example, the UE may communicate via an active BWP in accordance with an FDD mode and, upon expiration of the timer, the UE may switch the active BWP to a default BWP associated with the FDD mode. In some examples, the UE may implement the BWP switching scheme 500 to switch the BWP associated with the FDD mode. During the time period 505-*a*, the UE may communicate with the base station in an FDD mode on a single carrier in an unpaired radio frequency spectrum. The UE may send uplink transmissions to the base station using the active uplink BWP 515-*a*. The base station may send downlink transmission to the UE using the active downlink BWP 510-*a*. The active uplink BWP 515-*a* and the active downlink BWP 510-*a* may be separated by a frequency gap (e.g., a gap satisfying the minimum guard band 520-*a*). Upon the expiration of an inactivity timer associated with the downlink BWP 510-*a* (e.g., the UE may fail to receive DCI for a threshold time period), the UE may switch the active downlink BWP 510-*a* to the default downlink BWP 510-*b* shown in the time period 505-*c*.

As illustrated by the BWP switching scheme 500, the UE may maintain the active uplink BWP 515-*a* throughout the time periods 505-*a*, 505-*b*, and 505-*c*, although it is to be understood that the operations illustrated in the BWP switching scheme 500 may be performed differently (e.g., the active uplink BWP 515-*a* may be switched to a default uplink BWP 515 upon the expiration of a timer associated with the active uplink BWP 515-*a*, the active downlink BWP 510-*a* may be maintained, etc.). In some examples, the BWP switching scheme 500 may implement multiple timers (e.g., a timer for monitoring downlink inactivity and a second timer for monitoring uplink inactivity) and determine to switch corresponding active BWPs to default BWPs based on the timers. In such examples, the UE may restart a downlink inactivity timer when the UE detects DCI for downlink reception using a downlink BWP 510 and the UE may restart an uplink inactivity timer when the UE detects DCI for an uplink transmission using an uplink BWP 515. The default downlink BWP 510-*b* may be separated from the active uplink BWP 515-*a* by a guard band 525-*a* that satisfies the minimum guard band 520-*a* (e.g., the UE may perform BWP switching based on determining that the minimum guard band 520-*a* is satisfied).

Figure 5B:
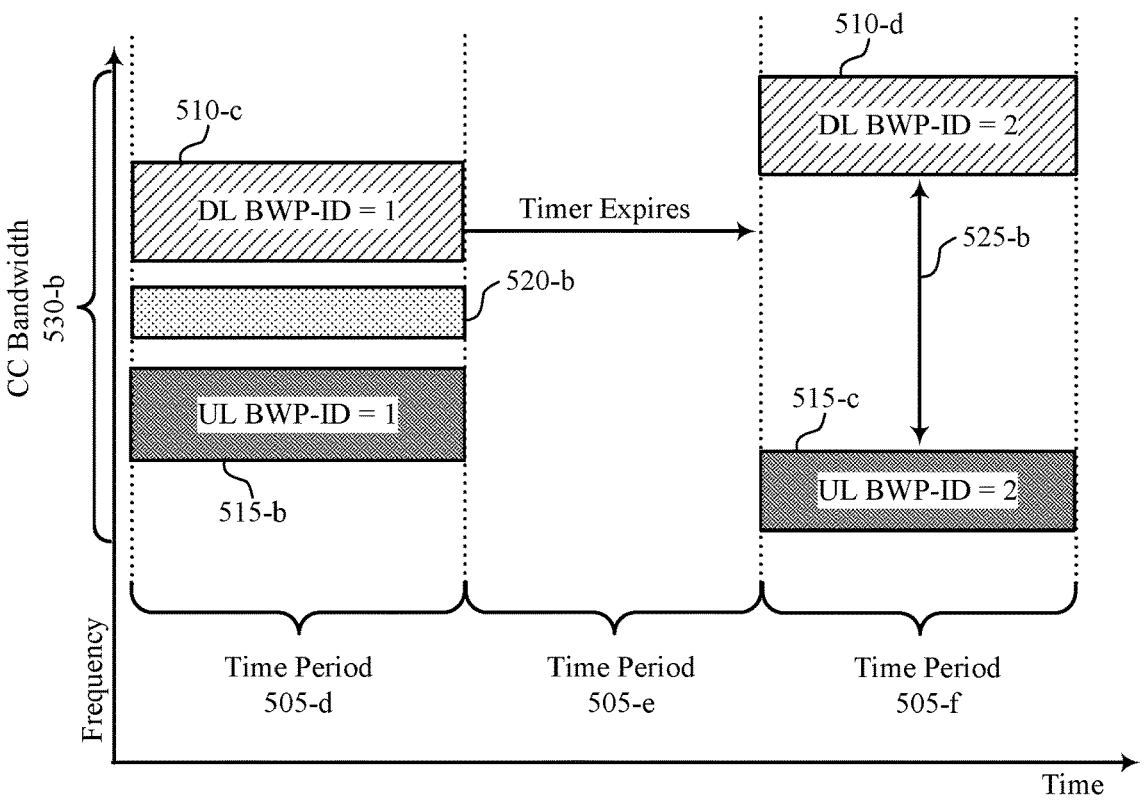

FIG. 5B may illustrate a BWP switching scheme 501 that may enable the UE to switch the BWP associated with the FDD mode. For example, during the time period 505-*d*, the UE may communicate with the base station in an FDD mode on a single carrier in an unpaired radio frequency spectrum. The UE may send uplink transmissions to the base station using the active uplink BWP 515-*b*. The base station may send downlink transmission to the UE using the active downlink BWP 510-*c*. The active uplink BWP 515-*b* and the active downlink BWP 510-*c* may be separated by a frequency gap (e.g., a gap satisfying the minimum guard band 520-*b*). Upon the expiration of an inactivity timer associated with the downlink BWP 510-*c* (e.g., the UE may fail to receive DCI for a threshold time period), the UE may switch the active downlink BWP 510-*c* to the default downlink BWP 510-*d* shown in the time period 505-*f*. Additionally or alternatively, the UE may switch the active uplink BWP 515-*b* to the default uplink BWP 515-*c* shown in the time period 505-*f*. Although illustrated as the expired timer corresponding to the active downlink BWP 510-*c*, is to be understood that the operations illustrated in the BWP switching scheme 501 may be performed differently (e.g., the timer may be associated with the active uplink BWP 515-*b*). The default downlink BWP 510-*d* may be separated from the active uplink BWP 515-*c* by a guard band 525-*b* that satisfies the minimum guard band 520-*b* (e.g., the UE may perform BWP switching based on determining that the minimum guard band 520-*b* is satisfied).

Figure 6:
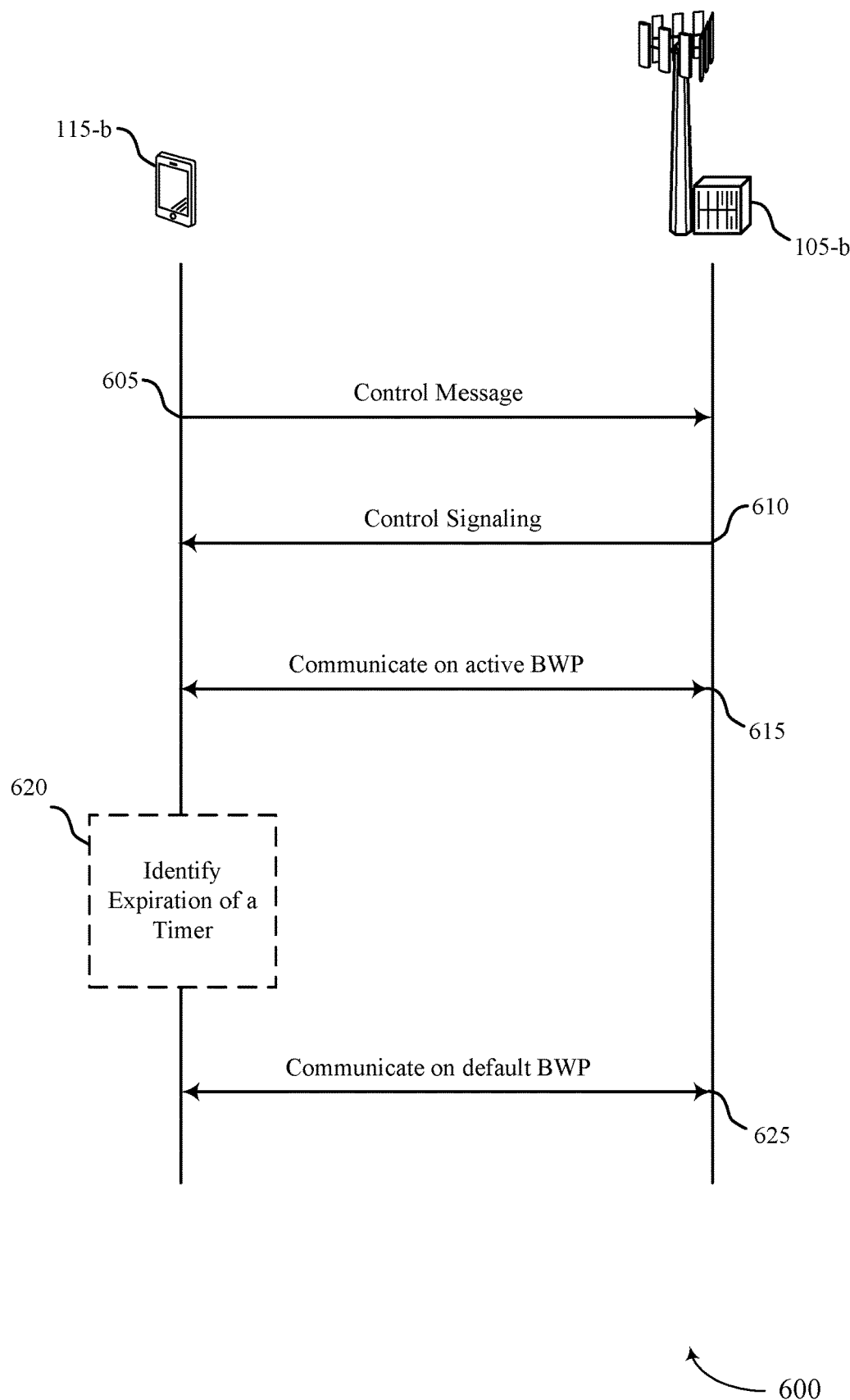
FIG. 6 illustrates an example of a process flow that supports BWP switching techniques for wireless communications systems in accordance with aspects of the present disclosure.

FIG. 6 illustrates an example of a process flow 600 that supports BWP switching techniques for wireless communications systems in accordance with aspects of the present disclosure. In some examples, process flow 600 may implement aspects of wireless communications systems 100 and 200 and the BWP switching schemes 300, 400, 500, and 501. For example, the process flow 600 may be implemented by a UE 115-*b* and a base station 105-*b*, which may be examples of UEs 115 and base stations 105 as described with reference to FIGS. 1 through 5.

At 605, the UE 115-*b* may transmit a control message to the base station 105-*b*. The control message may indicate a capability of the UE to operate in a FDD mode on a single carrier in an unpaired radio frequency spectrum. The control message may be an example of the control messages described herein with reference to FIGS. 1 through 5.

At 610, the base station 105-*b* may transmit control signaling to the UE 115-*b* as described herein. For example, the control signaling may indicate one or more default BWPs associated with a FDD mode, one or more default BWPs associated with a TDD mode, or both as described with reference to FIG. 5. In some examples, the control signaling may indicate a default uplink and downlink BWP pair (e.g., for TDD mode communications) and/or a default uplink BWP and a default downlink BWP (e.g., for FDD mode communications).

At 615, the UE 115-*b* and the base station 105-*b* may communicate on one or more active BWPs as described herein. For example, the UE 115-*b* may transmit uplink data or control signaling (e.g., via PUSCH or PUCCH) using an active uplink BWP. Additionally or alternatively, the UE 115-*b* may receive, from the base station 105-*b*, downlink data or control signaling (e.g., via PDSCH or PDCCH) using an active downlink BWP.

At 620, the UE 115-*b* or the base station 105-*b* may identify an expiration of a timer as described herein. For example, the UE 115-*b* may fail to receive DCI indicating an uplink transmission on the active uplink BWP, a downlink transmission on the active downlink BWP, or both, and the UE 115-*b* may perform one or more BWP switching operations in accordance with the BWP switching schemes described herein.

At 625, the UE 115-*b* and the base station 105-*b* may communicate on a default BWP as described herein. For example, the UE 115-*b* and the base station 105-*b* may switch from an active BWP associated with a TDD mode or a FDD mode to a default BWP associated with the TDD mode or a FDD mode, as described with reference to FIG. 5.

Figure 7:
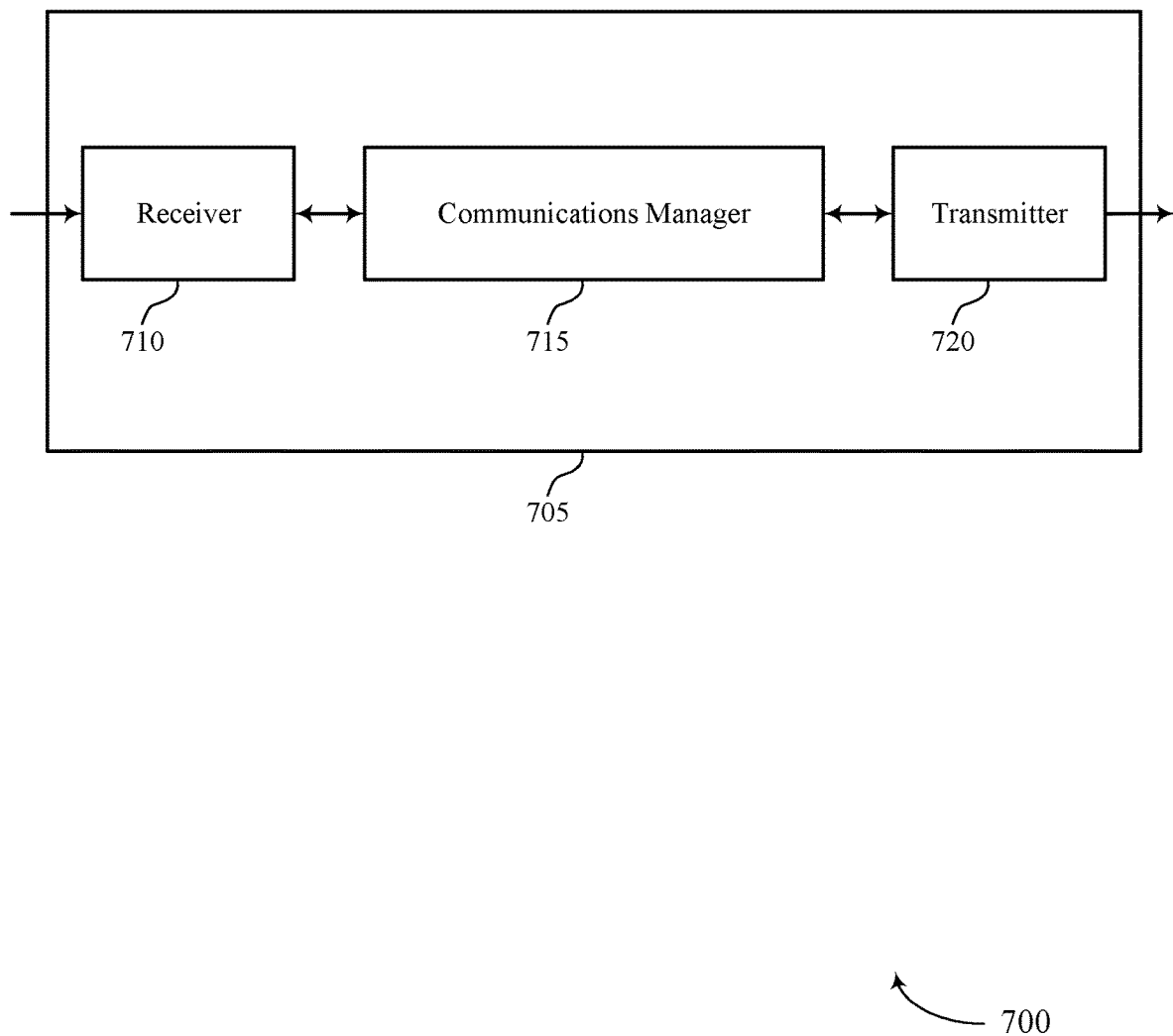
FIGS. 7 and 8 show block diagrams of devices that support BWP switching techniques for wireless communications systems in accordance with aspects of the present disclosure.

FIG. 7 shows a block diagram 700 of a device 705 that supports BWP switching techniques for wireless communications systems in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to BWP switching techniques for wireless communications systems, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit a control message indicating a capability of the UE to operate in a full duplex mode on a single carrier in an unpaired radio frequency spectrum, receive, from a base station, control signaling indicating a default BWP associated with the full duplex mode or a half-duplex mode based on the control message, and communicate, based on expiration of an inactivity timer associated with an active BWP, with the base station using the default BWP in accordance with the full duplex mode or the half-duplex mode. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages. For example, the communications manager 715 may implement one or more BWP switching schemes as described herein, which may enable a UE to perform BWP switching when the UE is capable of operating in an full duplex mode on a single carrier in an unpaired band, ensure that a minimum guard band is satisfied, among other examples. Such operations may increase the robustness of communications in a system.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
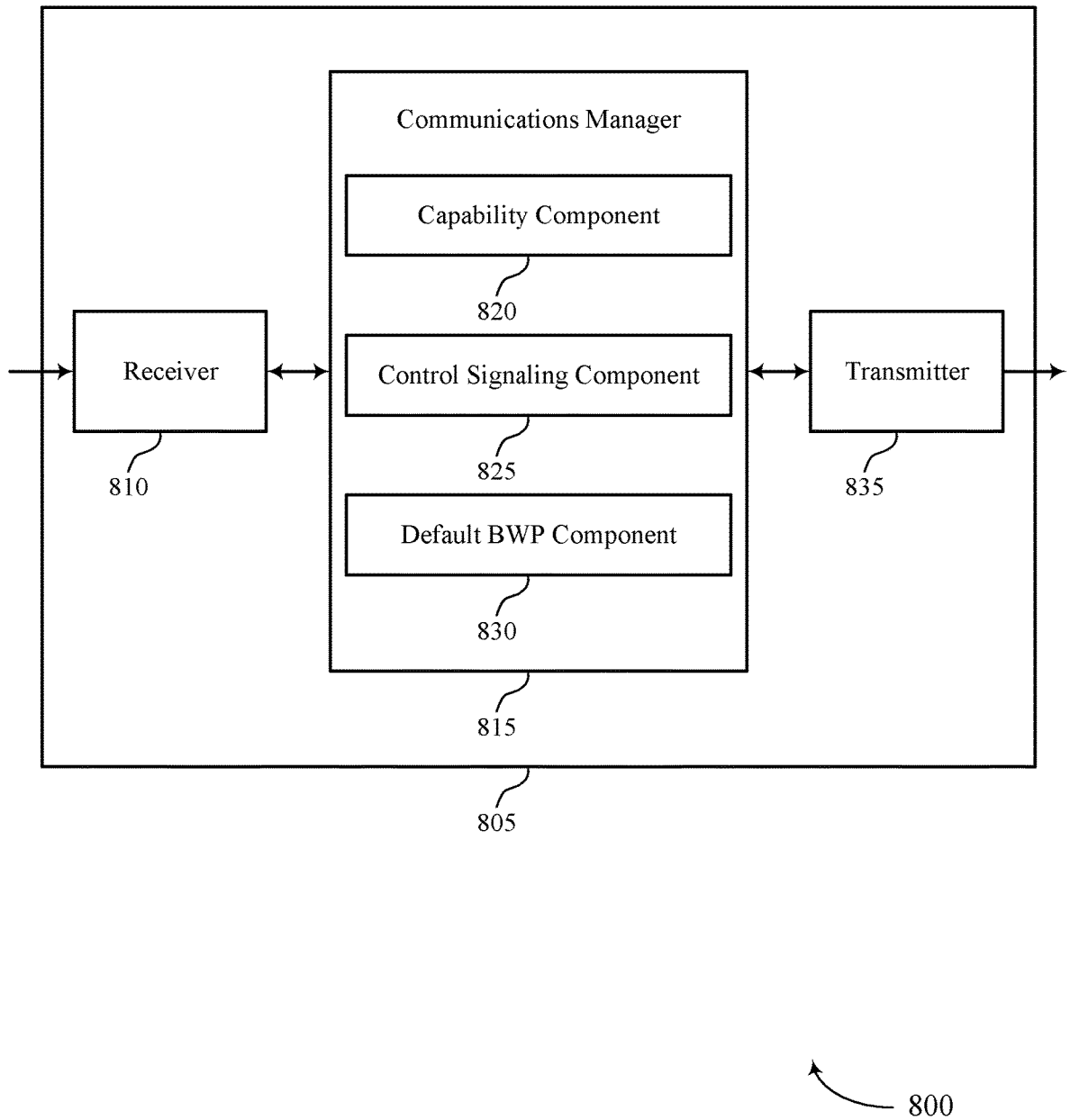

FIG. 8 shows a block diagram 800 of a device 805 that supports BWP switching techniques for wireless communications systems in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to BWP switching techniques for wireless communications systems, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a capability component 820, a control signaling component 825, and a default BWP component 830. The communications manager 815 may be an example of aspects of the communications manager 1010 described herein.

The capability component 820 may transmit a control message indicating a capability of the UE to operate in a full duplex mode on a single carrier in an unpaired radio frequency spectrum.

The control signaling component 825 may receive, from a base station, control signaling indicating a default BWP associated with the full duplex mode or half-duplex mode based on the control message.

The default BWP component 830 may communicate, based on expiration of an inactivity timer associated with an active BWP, with the base station using the default BWP in accordance with the full duplex mode or the half-duplex mode.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
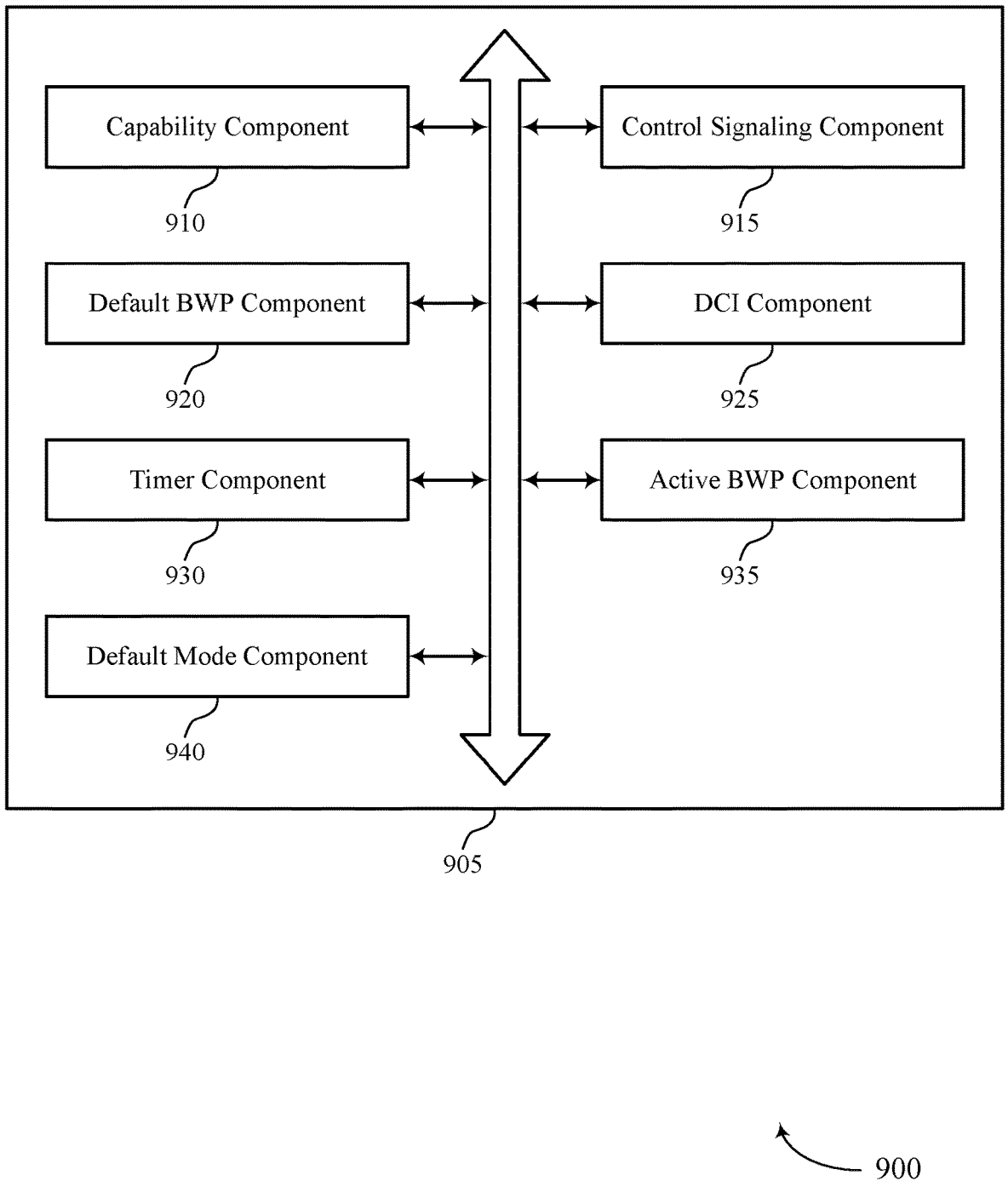
FIG. 9 shows a block diagram of a communications manager that supports BWP switching techniques for wireless communications systems in accordance with aspects of the present disclosure.

FIG. 9 shows a block diagram 900 of a communications manager 905 that supports BWP switching techniques for wireless communications systems in accordance with aspects of the present disclosure. The communications manager 905 may be an example of aspects of a communications manager 715, a communications manager 815, or a communications manager 1010 described herein. The communications manager 905 may include a capability component 910, a control signaling component 915, a default BWP component 920, a DCI component 925, a timer component 930, an active BWP component 935, and a default mode component 940. Each of these modules may communicate, directly or indirectly, with one another (e.g., via one or more buses).

The capability component 910 may transmit a control message indicating a capability of the UE to operate in a full duplex mode on a single carrier in an unpaired radio frequency spectrum.

The control signaling component 915 may receive, from a base station, control signaling indicating a default BWP associated with the full duplex mode or a half-duplex mode based on the control message. In some examples, the control signaling indicates that the default BWP includes a default uplink BWP and a default downlink BWP for operation in the half-duplex mode. In some examples, the control signaling indicates that the default BWP includes a default uplink BWP and a default downlink BWP for operation in the full duplex mode. In some examples, the control signaling indicates that the default BWP includes a first default uplink BWP and a first default downlink BWP for operation in the half-duplex mode, and a second default uplink BWP and a second default downlink BWP for operation in the full duplex mode.

In some examples, the control signaling indicates that the default BWP includes a first default BWP associated with the half-duplex mode and the default BWP includes a second default BWP associated with the full duplex mode.

In some examples, the control signaling component 915 may receive control signaling indicating the default BWP and a default operation mode. In some cases, the control signaling configures the UE to operate in one of the half-duplex mode or the full duplex mode upon expiration of the inactivity timer.

The default BWP component 920 may communicate, based on expiration of an inactivity timer associated with an active BWP, with the base station using the default BWP in accordance with the full duplex mode or the half-duplex mode.

In some examples, communicating with the base station includes communicating, in the half-duplex mode, using the default BWP that includes a default uplink BWP and a default downlink BWP, where the default uplink BWP differs from the active uplink BWP and the default downlink BWP differs from the active downlink BWP.

In some examples, communicating with the base station includes communicating, in the full duplex mode, using the default BWP that includes a default downlink BWP that differs from the active downlink BWP, and using the active uplink BWP.

In some examples, communicating with the base station includes communicating, in the full duplex mode, using the default BWP that includes a default downlink BWP and a default uplink BWP, where the default downlink BWP differs from the active downlink BWP and the default uplink BWP differs from the active uplink BWP.

In some examples, communicating with the base station includes communicating, in the full duplex mode, using the default BWP that includes a default downlink BWP, where the default downlink BWP differs from the active downlink BWP.

In some examples, communicating with the base station includes communicating, in the full duplex mode, using the default BWP that includes a default uplink BWP, where the default uplink BWP differs from the active uplink BWP.

In some examples, the default BWP component 920 may communicate, upon expiration of the inactivity timer, in one of the half-duplex mode or the full duplex mode subsequent to expiration of the inactivity timer based on the control signaling. In some cases, a guard band between the default downlink BWP and the active uplink BWP satisfies a threshold. In some cases, a guard band between the default downlink BWP and the default uplink BWP satisfies a threshold.

The DCI component 925 may receive downlink control information via the active BWP, the active BWP including an uplink active BWP or a downlink active BWP.

The timer component 930 may restart the inactivity timer based on receiving the downlink control information via the active BWP.

The active BWP component 935 may communicate, prior to expiration of the inactivity timer, in the full duplex mode using the active BWP, the active BWP including an active uplink BWP and an active downlink BWP.

In some examples, the active BWP component 935 may communicate, prior to expiration of the inactivity timer, in the half-duplex mode using the active BWP, the active BWP including an active uplink BWP and an active downlink BWP.

The default mode component 940 may communicate, upon expiration of the inactivity timer, in the default operation mode based on the control signaling. In some cases, the default operation mode includes the half-duplex mode or the full duplex mode. In some cases, the full duplex mode includes a FDD mode and the half-duplex mode includes a TDD mode, the FDD mode associated with an uplink portion and a downlink portion of the single carrier having overlapping frequency resources or separate frequency resources.

Figure 10:
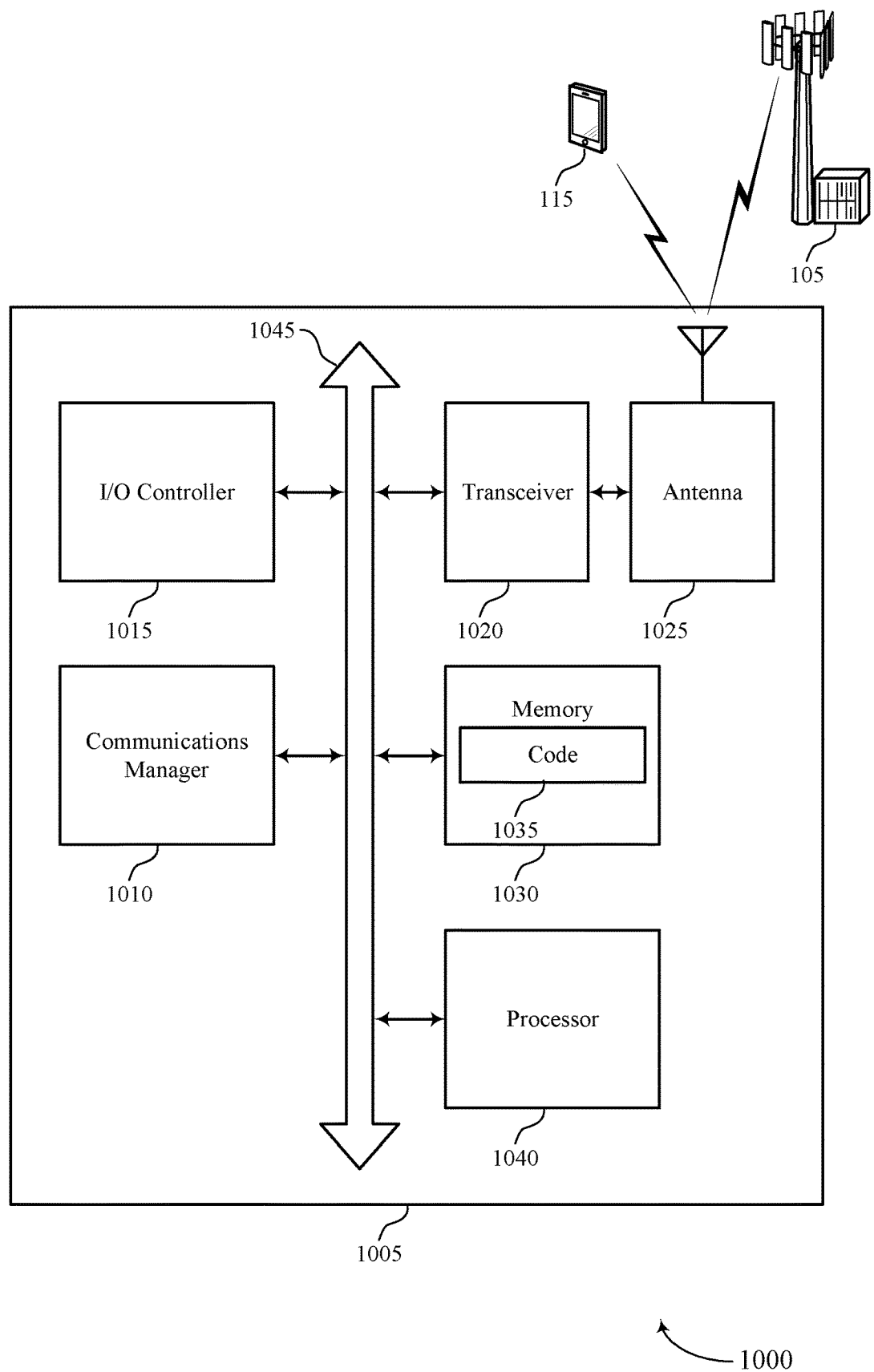
FIG. 10 shows a diagram of a system including a device that supports BWP switching techniques for wireless communications systems in accordance with aspects of the present disclosure.

FIG. 10 shows a diagram of a system 1000 including a device 1005 that supports BWP switching techniques for wireless communications systems in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit a control message indicating a capability of the UE to operate in a full duplex mode on a single carrier in an unpaired radio frequency spectrum, receive, from a base station, control signaling indicating a default BWP associated with the full duplex mode or a half-duplex mode based on the control message, and communicate, based on expiration of an inactivity timer associated with an active BWP, with the base station using the default BWP in accordance with the full duplex mode or the half-duplex mode.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting BWP switching techniques for wireless communications systems).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
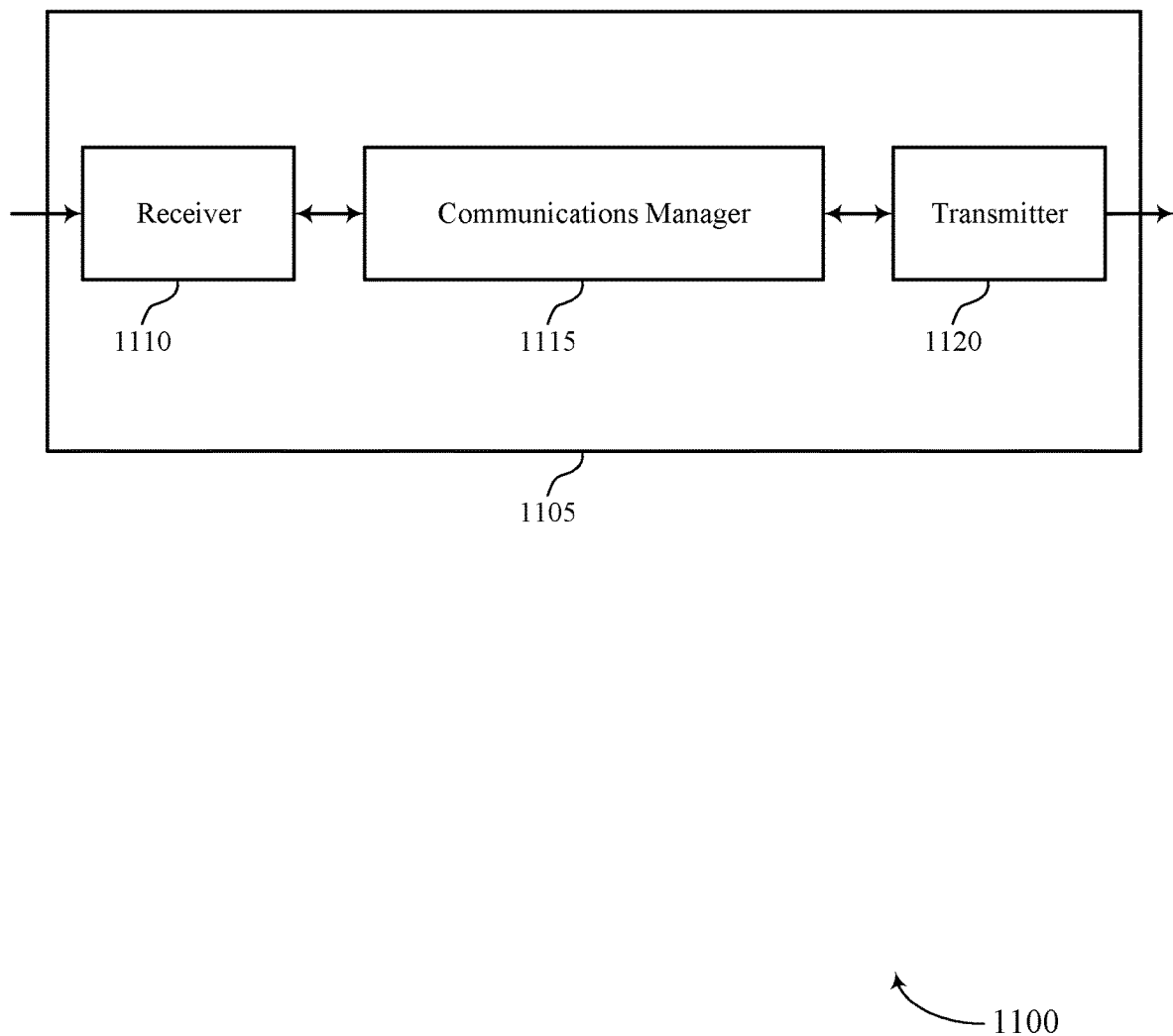
FIGS. 11 and 12 show block diagrams of devices that support BWP switching techniques for wireless communications systems in accordance with aspects of the present disclosure.

FIG. 11 shows a block diagram 1100 of a device 1105 that supports BWP switching techniques for wireless communications systems in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to BWP switching techniques for wireless communications systems, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive a control message indicating a capability of a UE to operate in a full duplex mode on a single carrier in an unpaired radio frequency spectrum, transmit, to the UE, control signaling indicating a default BWP associated with the full duplex mode or a half-duplex mode based on the control message, and communicate, based on expiration of an inactivity time period associated with an active BWP, with the UE using the default BWP in accordance with the full duplex mode or the half-duplex mode. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
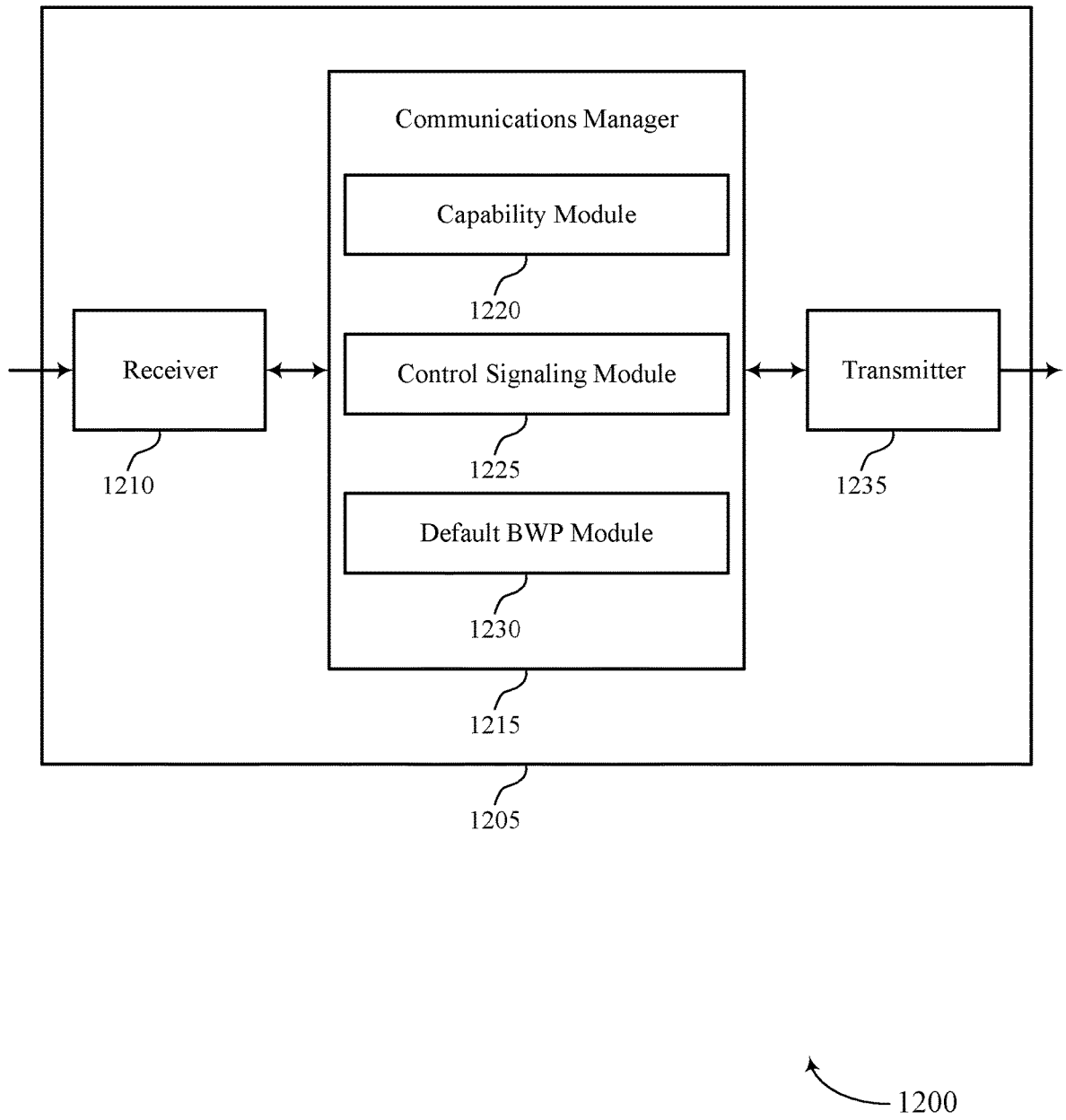

FIG. 12 shows a block diagram 1200 of a device 1205 that supports BWP switching techniques for wireless communications systems in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to BWP switching techniques for wireless communications systems, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a capability module 1220, a control signaling module 1225, and a default BWP module 1230. The communications manager 1215 may be an example of aspects of the communications manager 1410 described herein.

The capability module 1220 may receive a control message indicating a capability of a UE to operate in a full duplex mode on a single carrier in an unpaired radio frequency spectrum.

The control signaling module 1225 may transmit, to the UE, control signaling indicating a default BWP associated with the full duplex mode or a half-duplex mode based on the control message.

The default BWP module 1230 may communicate, based on expiration of an inactivity time period associated with an active BWP, with the UE using the default BWP in accordance with the full duplex mode or the half-duplex mode.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
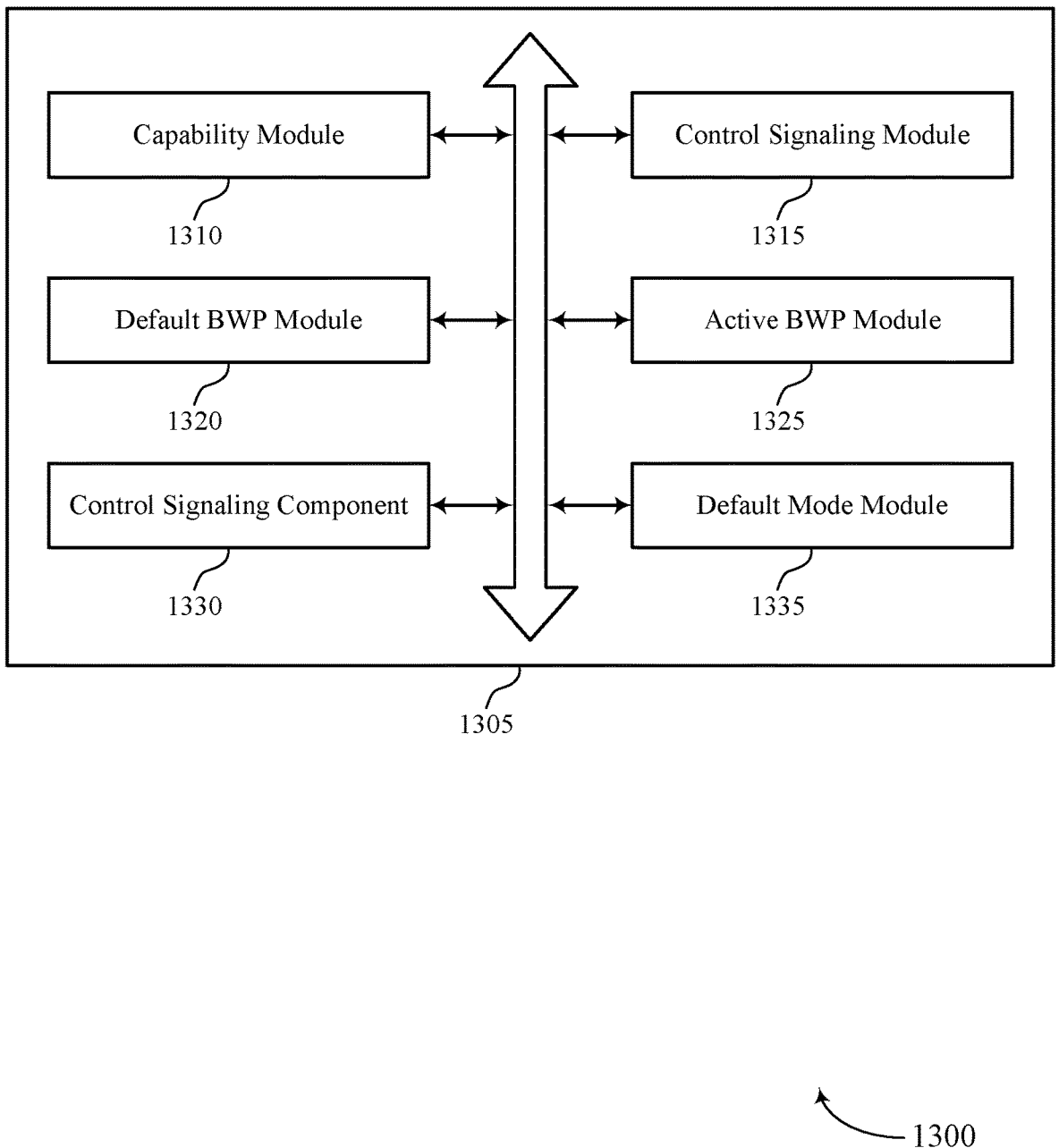
FIG. 13 shows a block diagram of a communications manager that supports BWP switching techniques for wireless communications systems in accordance with aspects of the present disclosure.

FIG. 13 shows a block diagram 1300 of a communications manager 1305 that supports BWP switching techniques for wireless communications systems in accordance with aspects of the present disclosure. The communications manager 1305 may be an example of aspects of a communications manager 1115, a communications manager 1215, or a communications manager 1410 described herein. The communications manager 1305 may include a capability module 1310, a control signaling module 1315, a default BWP module 1320, an active BWP module 1325, a control signaling component 1330, and a default mode module 1335. Each of these modules may communicate, directly or indirectly, with one another (e.g., via one or more buses).

The capability module 1310 may receive a control message indicating a capability of a UE to operate in a full duplex mode on a single carrier in an unpaired radio frequency spectrum.

The control signaling module 1315 may transmit, to the UE, control signaling indicating a default BWP associated with the full duplex mode or half-duplex mode based on the control message. In some examples, the control signaling indicates that the default BWP includes a default uplink BWP and a default downlink BWP for operation in the half-duplex mode. In some examples, the control signaling indicates that the default BWP includes a default uplink BWP and a default downlink BWP for operation in the full duplex mode. In some examples the control signaling indicates that the default BWP includes a first default uplink BWP and a first default downlink BWP for operation in the half-duplex mode, and a second default uplink BWP and a second default downlink BWP for operation in the full duplex mode. In some cases, the control signaling configures the UE to operate in one of the half-duplex mode or the full duplex mode upon expiration of the inactivity time period.

The default BWP module 1320 may communicate, based on expiration of an inactivity time period associated with an active BWP, with the UE using the default BWP in accordance with the full duplex mode or the half-duplex mode.

In some examples, communicating with the UE includes communicating, in the half-duplex mode, using the default BWP that includes a default uplink BWP and a default downlink BWP, where the default uplink BWP differs from the active uplink BWP and the default downlink BWP differs from the active downlink BWP.

In some examples, communicating with the UE includes communicating, in the full duplex mode, using the default BWP that includes a default downlink BWP that differs from the active downlink BWP, and using the active uplink BWP.

In some examples, communicating with the UE includes communicating, in the full duplex mode, using the default BWP that includes a default downlink BWP and a default uplink BWP, where the default downlink BWP differs from the active downlink BWP and the default uplink BWP differs from the active uplink BWP.

In some examples, communicating with the UE includes communicating, in the full duplex mode, using the default BWP that includes a default downlink BWP, where the default downlink BWP differs from the active downlink BWP.

In some examples, communicating with the UE includes communicating, in the full duplex mode, using the default BWP that includes a default uplink BWP, the default uplink BWP differs from the active uplink BWP.

In some examples, the default BWP module 1320 may communicate in one of the half-duplex mode or the full duplex mode subsequent to expiration of the inactivity time period based on the control signaling. In some cases, a guard band between the default downlink BWP and the active uplink BWP satisfies a threshold. In some cases, a guard band between the active downlink BWP and the default uplink BWP satisfies a threshold.

The active BWP module 1325 may communicate, prior to expiration of the inactivity time period, in the full duplex mode using the active BWP, the active BWP including an active uplink BWP and an active downlink BWP. In some examples, the active BWP module 1325 may communicate, prior to expiration of the inactivity time period, in the half-duplex mode using the active BWP, the active BWP including an active uplink BWP and an active downlink BWP.

The control signaling component 1330 may transmit the control signaling that indicates the default BWP that includes a first default BWP associated with the half-duplex mode and the default BWP that includes a second default BWP associated with the full duplex mode.

In some examples, the control signaling component 1330 may transmit the control signaling that indicates the default BWP and a default operation mode.

The default mode module 1335 may communicate, subsequent to expiration of the inactivity time period, in the default operation mode based on the control signaling. In some cases, the default operation mode includes the half-duplex mode or the full duplex mode.

Figure 14:
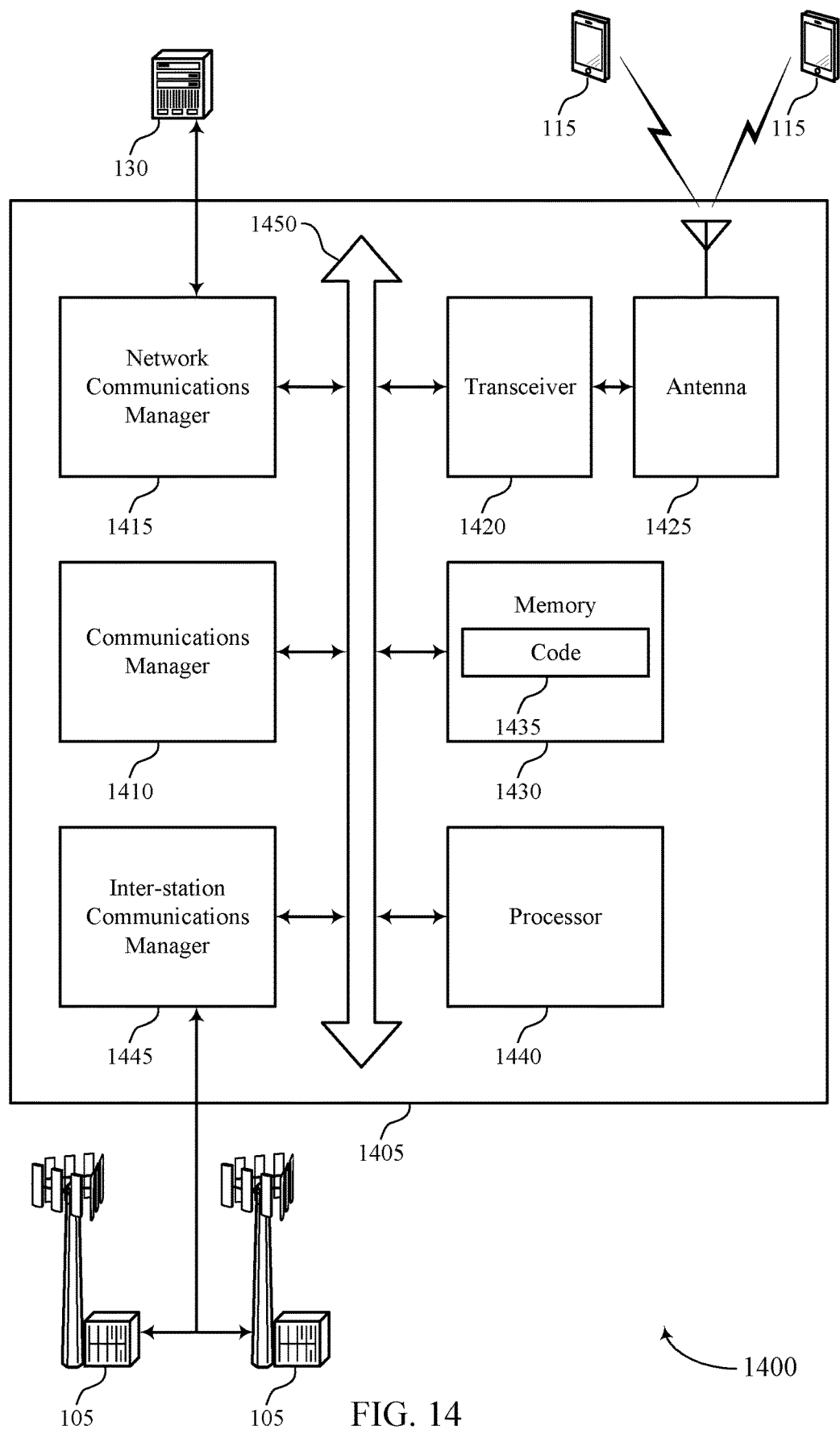
FIG. 14 shows a diagram of a system including a device that supports BWP switching techniques for wireless communications systems in accordance with aspects of the present disclosure.

FIG. 14 shows a diagram of a system 1400 including a device 1405 that supports BWP switching techniques for wireless communications systems in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive a control message indicating a capability of a UE to operate in a full duplex mode on a single carrier in an unpaired radio frequency spectrum, transmit, to the UE, control signaling indicating a default BWP associated with the full duplex mode or half-duplex mode based on the control message, and communicate, based on expiration of an inactivity time period associated with an active BWP, with the UE using the default BWP in accordance with the full duplex mode or the half-duplex mode.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting BWP switching techniques for wireless communications systems).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
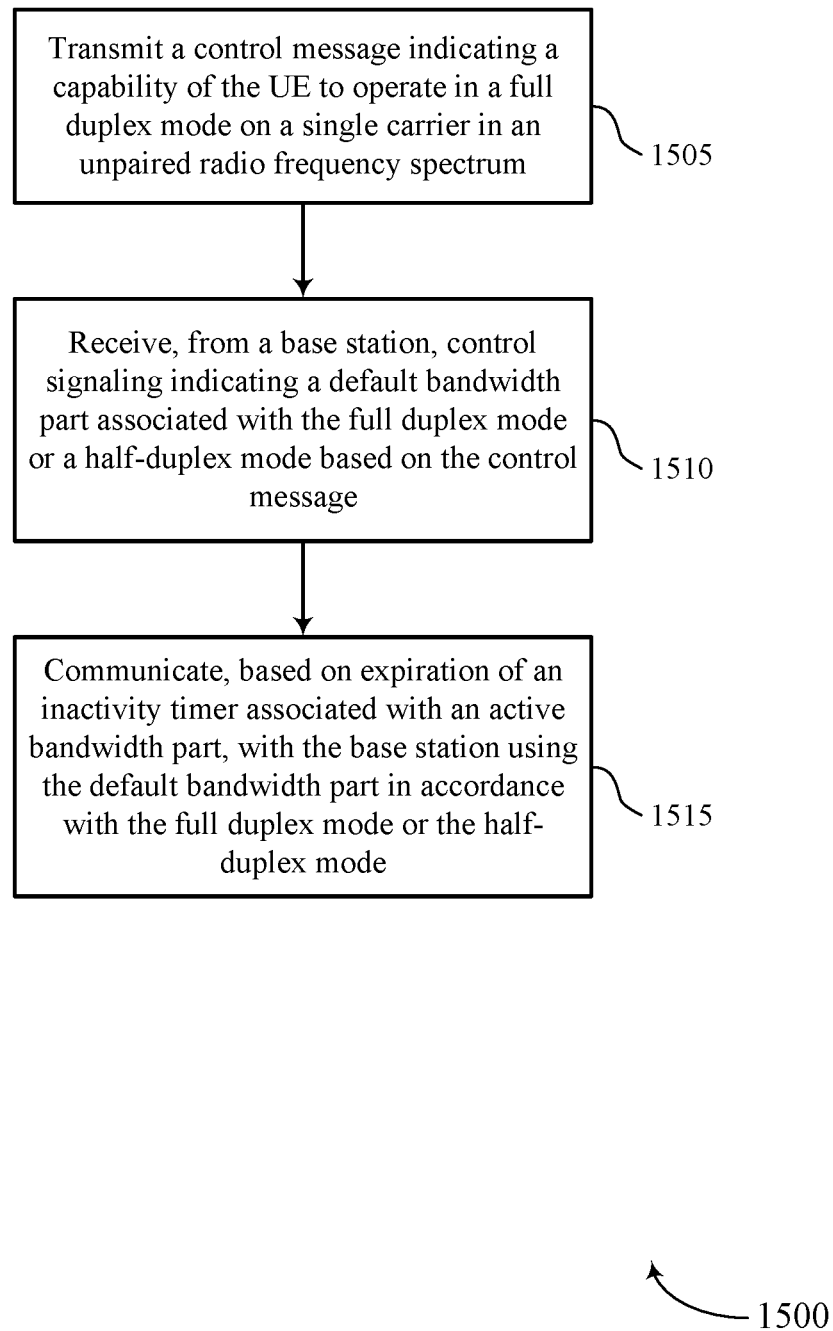
FIGS. 15 through 18 show flowcharts illustrating methods that support BWP switching techniques for wireless communications systems in accordance with aspects of the present disclosure.

FIG. 15 shows a flowchart illustrating a method 1500 that supports BWP switching techniques for wireless communications systems in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may transmit a control message indicating a capability of the UE to operate in a full duplex mode on a single carrier in an unpaired radio frequency spectrum. The operations of 1505 may be performed according to the methods described herein. In some examples, aspects of the operations of 1505 may be performed by a capability component as described with reference to FIGS. 7 through 10.

At 1510, the UE may receive, from a base station, control signaling indicating a default bandwidth part associated with the full duplex mode or a half-duplex mode based on the control message. The operations of 1510 may be performed according to the methods described herein. In some examples, aspects of the operations of 1510 may be performed by a control signaling component as described with reference to FIGS. 7 through 10.

At 1515, the UE may communicate, based on expiration of an inactivity timer associated with an active bandwidth part, with the base station using the default bandwidth part in accordance with the full duplex mode or the half-duplex mode. The operations of 1515 may be performed according to the methods described herein. In some examples, aspects of the operations of 1515 may be performed by a default BWP component as described with reference to FIGS. 7 through 10.

Figure 16:
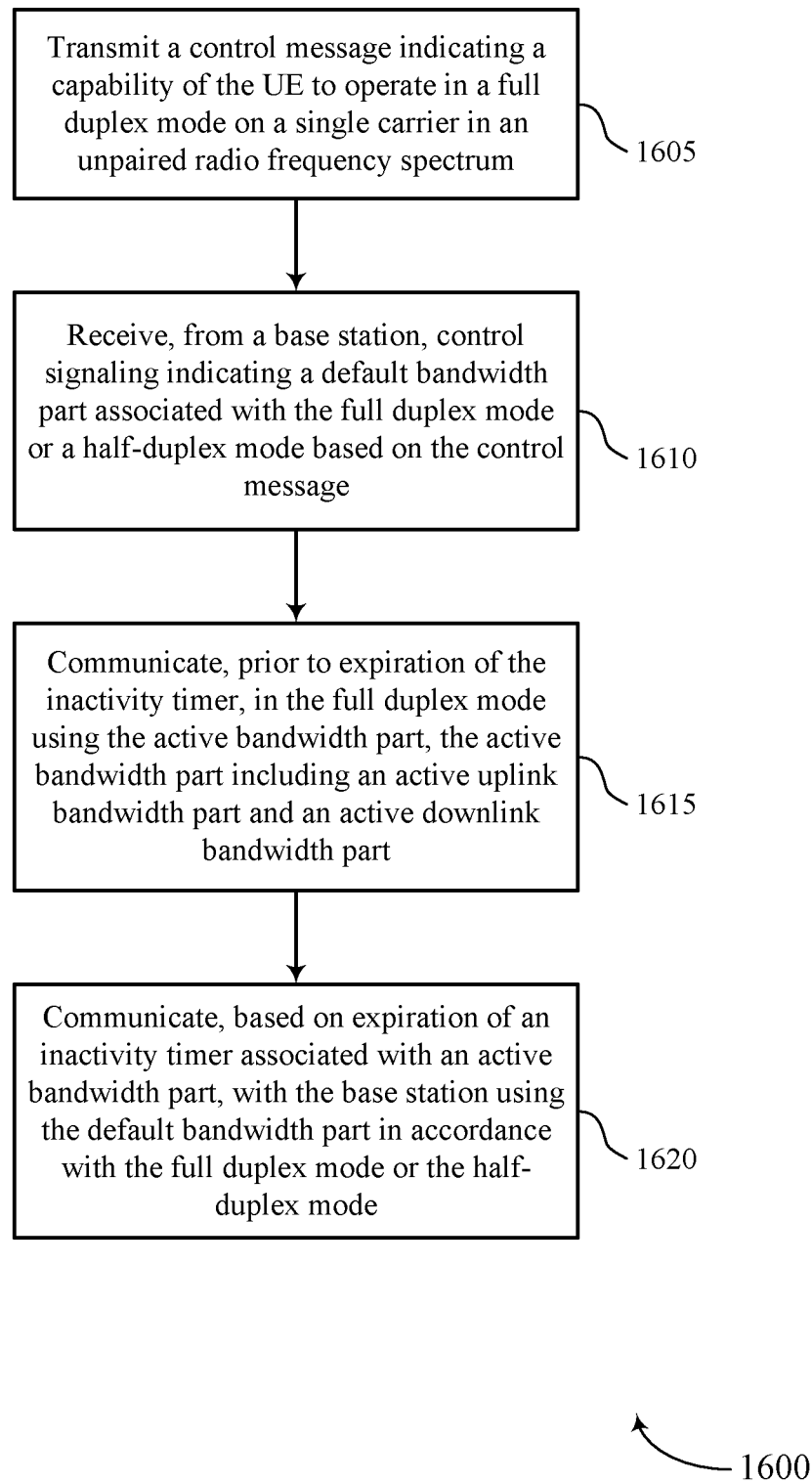

FIG. 16 shows a flowchart illustrating a method 1600 that supports bandwidth part switching techniques for wireless communications systems in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may transmit a control message indicating a capability of the UE to operate in a full duplex mode on a single carrier in an unpaired radio frequency spectrum. The operations of 1605 may be performed according to the methods described herein. In some examples, aspects of the operations of 1605 may be performed by a capability component as described with reference to FIGS. 7 through 10.

At 1610, the UE may receive, from a base station, control signaling indicating a default bandwidth part associated with the full duplex mode or a half-duplex mode based on the control message. The operations of 1610 may be performed according to the methods described herein. In some examples, aspects of the operations of 1610 may be performed by a control signaling component as described with reference to FIGS. 7 through 10.

At 1615, the UE may communicate, prior to expiration of the inactivity timer, in the full duplex mode using the active bandwidth part, the active bandwidth part including an active uplink bandwidth part and an active downlink bandwidth part. The operations of 1615 may be performed according to the methods described herein. In some examples, aspects of the operations of 1615 may be performed by an active BWP component as described with reference to FIGS. 7 through 10.

At 1620, the UE may communicate, based on expiration of an inactivity timer associated with an active bandwidth part, with the base station using the default bandwidth part in accordance with the full duplex mode or the half-duplex mode. The operations of 1620 may be performed according to the methods described herein. In some examples, aspects of the operations of 1620 may be performed by a default BWP component as described with reference to FIGS. 7 through 10.

Figure 17:
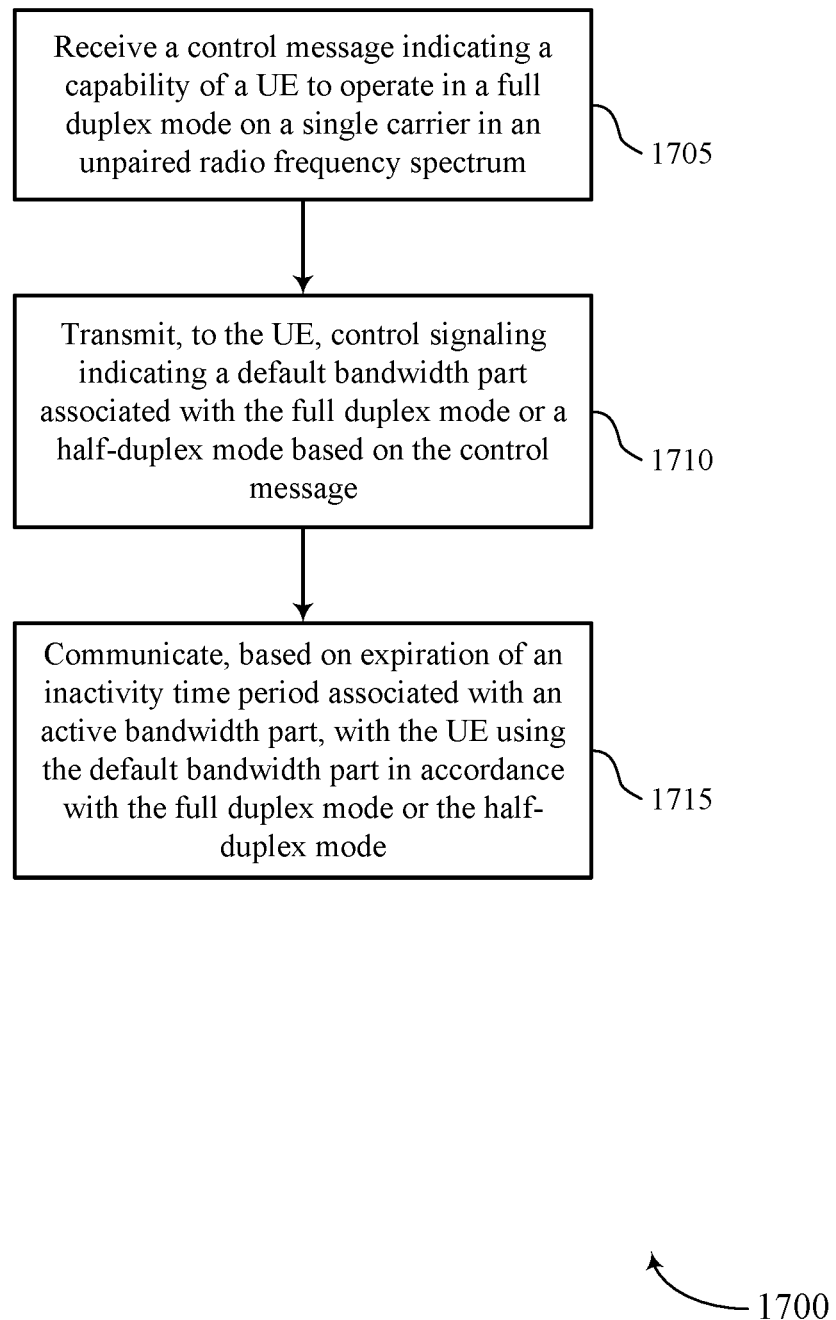

FIG. 17 shows a flowchart illustrating a method 1700 that supports bandwidth part switching techniques for wireless communications systems in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may receive a control message indicating a capability of a UE to operate in a full duplex mode on a single carrier in an unpaired radio frequency spectrum. The operations of 1705 may be performed according to the methods described herein. In some examples, aspects of the operations of 1705 may be performed by a capability module as described with reference to FIGS. 11 through 14.

At 1710, the base station may transmit, to the UE, control signaling indicating a default bandwidth part associated with the full duplex mode or a half-duplex mode based on the control message. The operations of 1710 may be performed according to the methods described herein. In some examples, aspects of the operations of 1710 may be performed by a control signaling module as described with reference to FIGS. 11 through 14.

At 1715, the base station may communicate, based on expiration of an inactivity time period associated with an active bandwidth part, with the UE using the default bandwidth part in accordance with the full duplex mode or the half-duplex mode. The operations of 1715 may be performed according to the methods described herein. In some examples, aspects of the operations of 1715 may be performed by a default BWP module as described with reference to FIGS. 11 through 14.

Figure 18:
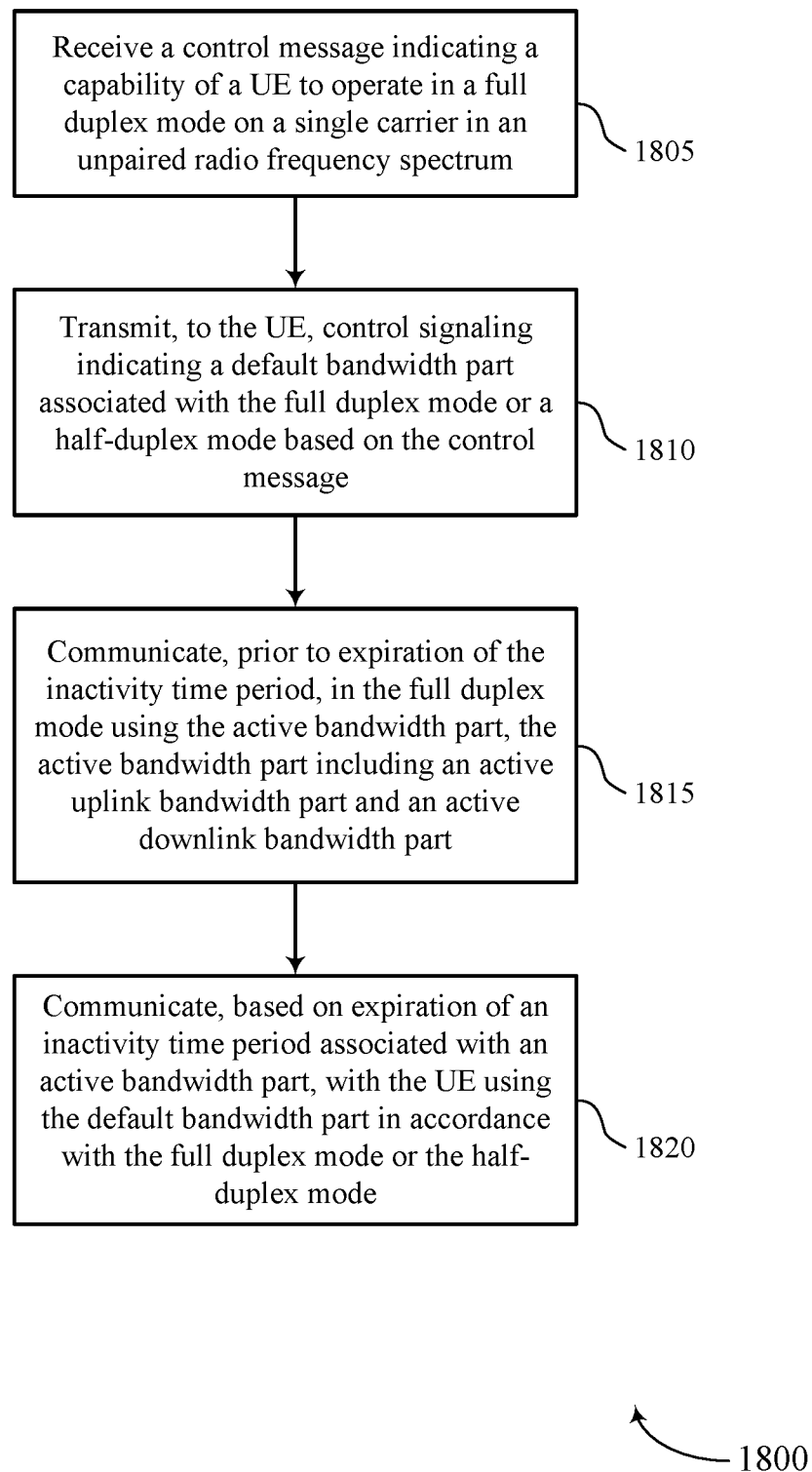

FIG. 18 shows a flowchart illustrating a method 1800 that supports bandwidth part switching techniques for wireless communications systems in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may receive a control message indicating a capability of a UE to operate in a full duplex mode on a single carrier in an unpaired radio frequency spectrum. The operations of 1805 may be performed according to the methods described herein. In some examples, aspects of the operations of 1805 may be performed by a capability module as described with reference to FIGS. 11 through 14.

At 1810, the base station may transmit, to the UE, control signaling indicating a default bandwidth part associated with the full duplex mode or a half-duplex mode based on the control message. The operations of 1810 may be performed according to the methods described herein. In some examples, aspects of the operations of 1810 may be performed by a control signaling module as described with reference to FIGS. 11 through 14.

At 1815, the base station may communicate, prior to expiration of the inactivity time period, in the full duplex mode using the active bandwidth part, the active bandwidth part including an active uplink bandwidth part and an active downlink bandwidth part. The operations of 1815 may be performed according to the methods described herein. In some examples, aspects of the operations of 1815 may be performed by an active BWP module as described with reference to FIGS. 11 through 14.

At 1820, the base station may communicate, based on expiration of an inactivity time period associated with an active bandwidth part, with the UE using the default bandwidth part in accordance with the full duplex mode or the half-duplex mode. The operations of 1820 may be performed according to the methods described herein. In some examples, aspects of the operations of 1820 may be performed by a default BWP module as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Aspect 1: A method for wireless communications at a UE, comprising: transmitting a control message indicating a capability of the UE to operate in a full duplex mode on a single carrier in an unpaired radio frequency spectrum; receiving, from a base station, control signaling indicating a default bandwidth part associated with the full duplex mode or a half-duplex mode based at least in part on the control message; and communicating, based at least in part on expiration of an inactivity timer associated with an active bandwidth part, with the base station using the default bandwidth part in accordance with the full duplex mode or the half-duplex mode.

Aspect 2: The method of aspect 1, wherein receiving the control signaling comprises: receiving the control signaling indicating the default bandwidth part that comprises a default uplink bandwidth part and a default downlink bandwidth part for operation in the half-duplex mode.

Aspect 3: The method of any of aspects 1 through 2, wherein receiving the control signaling comprises: receiving the control signaling indicating the default bandwidth part that comprises a default uplink bandwidth part and a default downlink bandwidth part for operation in the full duplex mode.

Aspect 4: The method of any of aspects 1 through 3, wherein receiving the control signaling comprises: receiving the control signaling indicating the default bandwidth part that comprises a first default uplink bandwidth part and a first default downlink bandwidth part for operation in the half-duplex mode, and a second default uplink bandwidth part and a second default downlink bandwidth part for operation in the full duplex mode.

Aspect 5: The method of any of aspects 1 through 4, wherein the control signaling configures the UE to operate in one of the half-duplex mode or the full duplex mode upon expiration of the inactivity timer.

Aspect 6: The method of any of aspects 1 through 5, further comprising: receiving downlink control information via the active bandwidth part, the active bandwidth part comprising an uplink active bandwidth part or a downlink active bandwidth part; and restarting the inactivity timer based at least in part on receiving the downlink control information via the active bandwidth part.

Aspect 7: The method of any of aspects 1 through 6, further comprising: communicating, prior to expiration of the inactivity timer, in the full duplex mode using the active bandwidth part, the active bandwidth part comprising an active uplink bandwidth part and an active downlink bandwidth part.

Aspect 8: The method of aspect 7, wherein communicating using the default bandwidth part comprises: communicating, in the half-duplex mode, using the default bandwidth part that comprises a default uplink bandwidth part and a default downlink bandwidth part, the default uplink bandwidth part differs from the active uplink bandwidth part and the default downlink bandwidth part differs from the active downlink bandwidth part.

Aspect 9: The method of any of aspects 7 through 8, wherein communicating using the default bandwidth part comprises: communicating, in the full duplex mode, using the default bandwidth part that comprises a default downlink bandwidth part that differs from the active downlink bandwidth part, and using the active uplink bandwidth part.

Aspect 10: The method of aspect 9, wherein a guard band between the default downlink bandwidth part and the active uplink bandwidth part satisfies a threshold.

Aspect 11: The method of any of aspects 7 through 10, wherein communicating using the default bandwidth part comprises: communicating, in the full duplex mode, using the default bandwidth part that comprises a default downlink bandwidth part and a default uplink bandwidth part, the default downlink bandwidth part differs from the active downlink bandwidth part and the default uplink bandwidth part differs from the active uplink bandwidth part.

Aspect 12: The method of aspect 11, wherein a guard band between the default downlink bandwidth part and the default uplink bandwidth part satisfies a threshold.

Aspect 13: The method of any of aspects 1 through 12, further comprising: communicating, prior to expiration of the inactivity timer, in the half-duplex mode using the active bandwidth part, the active bandwidth part comprising an active uplink bandwidth part and an active downlink bandwidth part.

Aspect 14: The method of aspect 13, wherein communicating using the default bandwidth part comprises: communicating, in the half-duplex mode, using the default bandwidth part that comprises a default uplink bandwidth part and a default downlink bandwidth part, the default uplink bandwidth part differs from the active uplink bandwidth part and the default downlink bandwidth part differs from the active downlink bandwidth part.

Aspect 15: The method of any of aspects 13 through 14, wherein communicating using the default bandwidth part comprises: communicating, in the full duplex mode, using the default bandwidth part that comprises a default downlink bandwidth part, the default downlink bandwidth part differs from the active downlink bandwidth part.

Aspect 16: The method of aspect 15, wherein communicating using the default bandwidth part comprises: communicating, in the full duplex mode, using the default bandwidth part that comprises a default uplink bandwidth part, the default uplink bandwidth part differs from the active uplink bandwidth part.

Aspect 17: The method of any of aspects 1 through 16, wherein receiving the control signaling comprises: receiving the control signaling that indicates the default bandwidth part that comprises a first default bandwidth part associated with the half-duplex mode and the default bandwidth part that includes a second default bandwidth part associated with the full duplex mode; and communicating, upon expiration of the inactivity timer, in one of the half-duplex mode or the full duplex mode subsequent to expiration of the inactivity timer based at least in part on the control signaling.

Aspect 18: The method of any of aspects 1 through 17, wherein receiving the control signaling comprises: receiving the control signaling that indicates the default bandwidth part and a default operation mode; and communicating, upon expiration of the inactivity timer, in the default operation mode based at least in part on the control signaling.

Aspect 19: The method of aspect 18, wherein the default operation mode comprises the half-duplex mode or the full duplex mode.

Aspect 20: The method of any of aspects 1 through 19, wherein the full duplex mode comprises a frequency division duplexing mode and the half-duplex mode comprises a time division duplexing mode, the frequency division duplexing mode associated with an uplink portion and a downlink portion of the single carrier having overlapping frequency resources or separate frequency resources.

Aspect 21: A method for wireless communications at a base station, comprising: receiving a control message indicating a capability of a UE to operate in a full duplex mode on a single carrier in an unpaired radio frequency spectrum; transmitting, to the UE, control signaling indicating a default bandwidth part associated with the full duplex mode or a half-duplex mode based at least in part on the control message; and communicating, based at least in part on expiration of an inactivity time period associated with an active bandwidth part, with the UE using the default bandwidth part in accordance with the full duplex mode or the half-duplex mode.

Aspect 22: The method of aspect 21, wherein transmitting the control signaling comprises: transmitting the control signaling indicating the default bandwidth part that comprises a default uplink bandwidth part and a default downlink bandwidth part for operation in the half-duplex mode.

Aspect 23: The method of any of aspects 21 through 22, wherein transmitting the control signaling comprises: transmitting the control signaling indicating the default bandwidth part that comprises a default uplink bandwidth part and a default downlink bandwidth part for operation in the full duplex mode.

Aspect 24: The method of any of aspects 21 through 23, wherein transmitting the control signaling comprises: transmitting the control signaling indicating the default bandwidth part that comprises a first default uplink bandwidth part and a first default downlink bandwidth part for operation in the half-duplex mode, and a second default uplink bandwidth part and a second default downlink bandwidth part for operation in the full duplex mode.

Aspect 25: The method of any of aspects 21 through 24, wherein the control signaling configures the UE to operate in one of the half-duplex mode or the full duplex mode upon expiration of the inactivity time period.

Aspect 26: The method of any of aspects 21 through 25, further comprising: communicating, prior to expiration of the inactivity time period, in the full duplex mode using the active bandwidth part, the active bandwidth part comprising an active uplink bandwidth part and an active downlink bandwidth part.

Aspect 27: The method of aspect 26, wherein communicating using the default bandwidth part comprises: communicating, in the half-duplex mode, using the default bandwidth part that comprises a default uplink bandwidth part and a default downlink bandwidth part, the default uplink bandwidth part differs from the active uplink bandwidth part and the default downlink bandwidth part differs from the active downlink bandwidth part.

Aspect 28: The method of any of aspects 26 through 27, wherein communicating using the default bandwidth part comprises: communicating, in the full duplex mode, using the default bandwidth part that comprises a default downlink bandwidth part that differs from the active downlink bandwidth part, and using the active uplink bandwidth part.

Aspect 29: The method of aspect 28, wherein a guard band between the default downlink bandwidth part and the active uplink bandwidth part satisfies a threshold.

Aspect 30: The method of any of aspects 26 through 29, wherein communicating using the default bandwidth part comprises: communicating, in the full duplex mode, using the default bandwidth part that comprises a default downlink bandwidth part and a default uplink bandwidth part, the default downlink bandwidth part differs from the active downlink bandwidth part and the default uplink bandwidth part differs from the active uplink bandwidth part.

Aspect 31: The method of aspect 30, wherein a guard band between the default downlink bandwidth part and the default uplink bandwidth part satisfies a threshold.

Aspect 32: The method of any of aspects 21 through 31, further comprising: communicating, prior to expiration of the inactivity time period, in the half-duplex mode using the active bandwidth part, the active bandwidth part comprising an active uplink bandwidth part and an active downlink bandwidth part.

Aspect 33: The method of aspect 32, wherein communicating using the default bandwidth part comprises: communicating, in the half-duplex mode, using the default bandwidth part that comprises a default uplink bandwidth part and a default downlink bandwidth part, the default uplink bandwidth part differs from the active uplink bandwidth part and the default downlink bandwidth part differs from the active downlink bandwidth part.

Aspect 34: The method of any of aspects 32 through 33, wherein communicating using the default bandwidth part comprises: communicating, in the full duplex mode, using the default bandwidth part that comprises a default downlink bandwidth part, the default downlink bandwidth part differs from the active downlink bandwidth part.

Aspect 35: The method of aspect 34, wherein communicating using the default bandwidth part comprises: communicating, in the full duplex mode, using the default bandwidth part that comprises a default uplink bandwidth part, the default uplink bandwidth part differs from the active uplink bandwidth part.

Aspect 36: The method of any of aspects 21 through 35, wherein transmitting the control signaling comprises: transmitting the control signaling that indicates the default bandwidth part that comprises a first default bandwidth part associated with the half-duplex mode and the default bandwidth part that includes a second default bandwidth part associated with the full duplex mode; and communicating in one of the half-duplex mode or the full duplex mode subsequent to expiration of the inactivity time period based at least in part on the control signaling.

Aspect 37: The method of any of aspects 21 through 36, wherein transmitting the control signaling comprises: transmitting the control signaling that indicates the default bandwidth part and a default operation mode; and communicating, subsequent to expiration of the inactivity time period, in the default operation mode based at least in part on the control signaling.

Aspect 38: The method of aspect 37, wherein the default operation mode comprises the half-duplex mode or the full duplex mode.

Aspect 39: An apparatus for wireless communications at a UE, comprising a processor; memory coupled with the processor; and instructions stored in the memory and executable by the processor to cause the apparatus to perform a method of any of aspects 1 through 20.

Aspect 40: An apparatus for wireless communications at a UE, comprising at least one means for performing a method of any of aspects 1 through 20.

Aspect 41: A non-transitory computer-readable medium storing code for wireless communications at a UE, the code comprising instructions executable by a processor to perform a method of any of aspects 1 through 20.

Aspect 42: An apparatus for wireless communications at a base station, comprising a processor; memory coupled with the processor; and instructions stored in the memory and executable by the processor to cause the apparatus to perform a method of any of aspects 21 through 38.

Aspect 43: An apparatus for wireless communications at a base station, comprising at least one means for performing a method of any of aspects 21 through 38.

Aspect 44: A non-transitory computer-readable medium storing code for wireless communications at a base station, the code comprising instructions executable by a processor to perform a method of any of aspects 21 through 38.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting a control message indicating a capability of the UE to operate in a full duplex mode on a single carrier in an unpaired radio frequency spectrum;
    receiving, from a network entity, based at least in part on the capability of the UE, control signaling indicating to the UE to operate using a default bandwidth part upon expiration of an inactivity timer, the default bandwidth part associated with the full duplex mode or a half-duplex mode based at least in part on the capability of the UE; and
    communicating, based at least in part on expiration of the inactivity timer associated with an active bandwidth part, with the network entity using the default bandwidth part in accordance with the full duplex mode or the half-duplex mode, wherein the default bandwidth part comprises a default downlink bandwidth part and the active bandwidth part comprises an active uplink bandwidth part, and wherein a guard band between the default downlink bandwidth part and the active uplink bandwidth part satisfies a threshold.

2. The method of claim 1, wherein receiving the control signaling comprises:
    receiving the control signaling indicating the default bandwidth part that comprises a default uplink bandwidth part and the default downlink bandwidth part for operation in the half-duplex mode.

3. The method of claim 1, wherein receiving the control signaling comprises:
    receiving the control signaling indicating the default bandwidth part that comprises a default uplink bandwidth part and the default downlink bandwidth part for operation in the full duplex mode.

4. The method of claim 1, wherein receiving the control signaling comprises:
receiving the control signaling indicating the default bandwidth part that comprises a first default uplink bandwidth part and a first default downlink bandwidth part for operation in the half-duplex mode, and a second default uplink bandwidth part and a second default downlink bandwidth part for operation in the full duplex mode.

5. The method of claim 1, wherein the control signaling configures the UE to operate in one of the half-duplex mode or the full duplex mode upon expiration of the inactivity timer.

6. The method of claim 1, further comprising:
receiving downlink control information via the active bandwidth part, the active bandwidth part comprising an uplink active bandwidth part or a downlink active bandwidth part; and
restarting the inactivity timer based at least in part on receiving the downlink control information via the active bandwidth part.

7. The method of claim 1, further comprising:
communicating, prior to expiration of the inactivity timer, in the full duplex mode using the active bandwidth part, the active bandwidth part comprising the active uplink bandwidth part and an active downlink bandwidth part.

8. The method of claim 7, wherein communicating using the default bandwidth part comprises:
communicating, in the half-duplex mode, using the default bandwidth part that comprises a default uplink bandwidth part and the default downlink bandwidth part, the default uplink bandwidth part differs from the active uplink bandwidth part and the default downlink bandwidth part differs from the active downlink bandwidth part.

9. The method of claim 7, wherein communicating using the default bandwidth part comprises:
communicating, in the full duplex mode, using the default bandwidth part that comprises the default downlink bandwidth part that differs from the active downlink bandwidth part, and using the active uplink bandwidth part.

10. The method of claim 7, wherein communicating using the default bandwidth part comprises:
communicating, in the full duplex mode, using the default bandwidth part that comprises the default downlink bandwidth part and a default uplink bandwidth part, the default downlink bandwidth part differs from the active downlink bandwidth part and the default uplink bandwidth part differs from the active uplink bandwidth part.

11. The method of claim 10, wherein a second guard band between the default downlink bandwidth part and the default uplink bandwidth part satisfies a second threshold.

12. The method of claim 1, further comprising:
communicating, prior to expiration of the inactivity timer, in the half-duplex mode using the active bandwidth part, the active bandwidth part comprising the active uplink bandwidth part and an active downlink bandwidth part.

13. The method of claim 12, wherein communicating using the default bandwidth part comprises:
communicating, in the half-duplex mode, using the default bandwidth part that comprises a default uplink bandwidth part and the default downlink bandwidth part, the default uplink bandwidth part differs from the active uplink bandwidth part and the default downlink bandwidth part differs from the active downlink bandwidth part.

14. The method of claim 12, wherein communicating using the default bandwidth part comprises:
communicating, in the full duplex mode, using the default bandwidth part that comprises the default downlink bandwidth part, the default downlink bandwidth part differs from the active downlink bandwidth part.

15. The method of claim 14, wherein communicating using the default bandwidth part comprises:
communicating, in the full duplex mode, using the default bandwidth part that comprises a default uplink bandwidth part, the default uplink bandwidth part differs from the active uplink bandwidth part.

16. The method of claim 1, wherein receiving the control signaling comprises:
receiving the control signaling that indicates the default bandwidth part that comprises a first default bandwidth part associated with the half-duplex mode and the default bandwidth part that includes a second default bandwidth part associated with the full duplex mode; and
communicating, upon expiration of the inactivity timer, in one of the half-duplex mode or the full duplex mode subsequent to expiration of the inactivity timer based at least in part on the control signaling.

17. The method of claim 1, wherein receiving the control signaling comprises:
receiving the control signaling that indicates the default bandwidth part and a default operation mode; and
communicating, upon expiration of the inactivity timer, in the default operation mode based at least in part on the control signaling.

18. The method of claim 17, wherein the default operation mode comprises the half-duplex mode or the full duplex mode.

19. The method of claim 1, wherein the full duplex mode comprises a frequency division duplexing mode and the half-duplex mode comprises a time division duplexing mode, the frequency division duplexing mode associated with an uplink portion and a downlink portion of the single carrier having overlapping frequency resources or separate frequency resources.

20. A method for wireless communications at a network entity, comprising:
receiving a control message indicating a capability of a user equipment (UE) to operate in a full duplex mode on a single carrier in an unpaired radio frequency spectrum;
transmitting, to the UE, based at least in part on the capability of the UE, control signaling indicating to the UE to operate using a default bandwidth part upon expiration of an inactivity time period, the default bandwidth part associated with the full duplex mode or a half-duplex mode based at least in part on the capability of the UE; and
communicating, based at least in part on expiration of the inactivity time period associated with an active bandwidth part, with the UE using the default bandwidth part in accordance with the full duplex mode or the half-duplex mode, wherein the default bandwidth part comprises a default downlink bandwidth part and the active bandwidth part comprises an active uplink bandwidth part, and wherein a guard band between the default downlink bandwidth part and the active uplink bandwidth part satisfies a threshold.

21. The method of claim 20, wherein transmitting the control signaling comprises:
   transmitting the control signaling indicating the default bandwidth part that comprises a default uplink bandwidth part and the default downlink bandwidth part for operation in the half-duplex mode.

22. The method of claim 20, wherein transmitting the control signaling comprises:
   transmitting the control signaling indicating the default bandwidth part that comprises a default uplink bandwidth part and the default downlink bandwidth part for operation in the full duplex mode.

23. The method of claim 20, wherein transmitting the control signaling comprises:
   transmitting the control signaling indicating the default bandwidth part that comprises a first default uplink bandwidth part and a first default downlink bandwidth part for operation in the half-duplex mode, and a second default uplink bandwidth part and a second default downlink bandwidth part for operation in the full duplex mode.

24. The method of claim 20, wherein the control signaling configures the UE to operate in one of the half-duplex mode or the full duplex mode upon expiration of the inactivity time period.

25. The method of claim 20, further comprising:
   communicating, prior to expiration of the inactivity time period, in the full duplex mode using the active bandwidth part, the active bandwidth part comprising the active uplink bandwidth part and an active downlink bandwidth part.

26. The method of claim 25, wherein communicating using the default bandwidth part comprises:
   communicating, in the half-duplex mode, using the default bandwidth part that comprises a default uplink bandwidth part and the default downlink bandwidth part, the default uplink bandwidth part differs from the active uplink bandwidth part and the default downlink bandwidth part differs from the active downlink bandwidth part.

27. The method of claim 25, wherein communicating using the default bandwidth part comprises:
   communicating, in the full duplex mode, using the default bandwidth part that comprises the default downlink bandwidth part that differs from the active downlink bandwidth part, and using the active uplink bandwidth part.

28. An apparatus for wireless communications at a user equipment (UE), comprising:
   a processor,
   memory coupled with the processor; and
   instructions stored in the memory and executable by the processor to cause the apparatus to:
      transmit a control message indicating a capability of the UE to operate in a full duplex mode on a single carrier in an unpaired radio frequency spectrum;
      receive, from a network entity, based at least in part on the capability of the UE, control signaling indicating to the UE to operate using a default bandwidth part upon expiration of an inactivity timer, the default bandwidth part associated with the full duplex mode or a half-duplex mode based at least in part on the capability of the UE; and
      communicate, based at least in part on expiration of the inactivity timer associated with an active bandwidth part, with the network entity using the default bandwidth part in accordance with the full duplex mode or the half-duplex mode, wherein the default bandwidth part comprises a default downlink bandwidth part and the active bandwidth part comprises an active uplink bandwidth part, and wherein a guard band between the default downlink bandwidth part and the active uplink bandwidth part satisfies a threshold.

29. An apparatus for wireless communications at a network entity, comprising:
   a processor,
   memory coupled with the processor; and
   instructions stored in the memory and executable by the processor to cause the apparatus to:
      receive a control message indicating a capability of a user equipment (UE) to operate in a full duplex mode on a single carrier in an unpaired radio frequency spectrum;
      transmit, to the UE, based at least in part on the capability of the UE, control signaling indicating to the UE to operate using a default bandwidth part upon expiration of an inactivity time period, the default bandwidth part associated with the full duplex mode or a half-duplex mode based at least in part on the capability of the UE; and
      communicate, based at least in part on expiration of the inactivity time period associated with an active bandwidth part, with the UE using the default bandwidth part in accordance with the full duplex mode or the half-duplex mode, wherein the default bandwidth part comprises a default downlink bandwidth part and the active bandwidth part comprises an active uplink bandwidth part, and wherein a guard band between the default downlink bandwidth part and the active uplink bandwidth part satisfies a threshold.

* * * * *